US009792697B2

(12) United States Patent
Nagamine et al.

(10) Patent No.: US 9,792,697 B2
(45) Date of Patent: Oct. 17, 2017

(54) STATE ESTIMATION APPARATUS, STATE ESTIMATION METHOD, AND INTEGRATED CIRCUIT

(71) Applicant: MegaChips Corporation, Osaka-shi (JP)

(72) Inventors: Kenta Nagamine, Osaka (JP); Hiromu Hasegawa, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 171 days.

(21) Appl. No.: 14/614,800

(22) Filed: Feb. 5, 2015

(65) Prior Publication Data
US 2015/0278601 A1   Oct. 1, 2015

(30) Foreign Application Priority Data
Mar. 27, 2014   (JP) .................................. 2014-065876

(51) Int. Cl.
*G06K 9/00*   (2006.01)
*G06T 7/277*   (2017.01)

(52) U.S. Cl.
CPC .... *G06T 7/277* (2017.01); *G06T 2207/10016* (2013.01); *G06T 2207/20076* (2013.01)

(58) Field of Classification Search
USPC ................... 342/357.52; 348/135, 169, 335; 382/100, 103, 195; 463/1; 704/236
See application file for complete search history.

(56) References Cited

U.S. PATENT DOCUMENTS

| | | | | |
|---|---|---|---|---|
| 6,999,599 B2 * | 2/2006 | Rui | ..................... | G06K 9/00234 382/103 |
| 8,175,336 B2 * | 5/2012 | Kizuki | .................... | G06T 7/208 382/100 |
| 8,223,207 B2 * | 7/2012 | Baba | ....................... | G06T 7/208 348/169 |
| 8,229,164 B2 * | 7/2012 | Miyamoto | ................ | B60R 1/00 382/103 |
| 8,233,661 B2 * | 7/2012 | Ikenoue | ................... | G06T 7/277 348/169 |
| 8,565,538 B2 * | 10/2013 | Ranganathan | ..... | G06K 9/00664 348/335 |
| 8,570,371 B2 * | 10/2013 | Yamashita | .............. | G06T 7/204 348/135 |
| 8,616,971 B2 * | 12/2013 | Lundback | .............. | A63D 15/20 463/1 |
| 8,891,821 B2 * | 11/2014 | Sato | ........................ | G06T 7/208 382/103 |
| 8,908,912 B2 * | 12/2014 | Liu | ........................ | G06T 7/208 382/103 |
| 9,031,279 B2 * | 5/2015 | Gefen | ..................... | G06T 7/204 382/103 |

(Continued)

FOREIGN PATENT DOCUMENTS

JP   2012-234466   11/2012

OTHER PUBLICATIONS

Norikazu Ikoma, et al., "Multi-target tracking in video by SMC-PHD filter with elimination of other targets and state dependent multi-modal likelihoods", Information Fusion, 16th International Conference, Jul. 2013, 8 pages.

*Primary Examiner* — Xuemei Chen
(74) *Attorney, Agent, or Firm* — Oblon, McClelland, Maier & Neustadt, L.L.P.

(57) ABSTRACT

A state estimation apparatus appropriately estimates the internal state of an observation target by calculating a likelihood from observation data, and tracks, for example, multiple objects in a moving image and detects a new object and adds the object as a tracking target in an appropriate manner. A labeling unit detects a closed area from an observation image, and adds a label number to the closed area to generate a label image. A likelihood obtaining unit generates an object-erased image for new object detection by erasing image areas corresponding to all the currently-tracked objects. The apparatus performs the process for detecting a new object using the object-erased image for new object detection based on label numbers. The apparatus is appropriately prevented from erroneously determining that an area of the object-erased image for new object detection corresponding to the currently-tracked object and remaining after the erasure corresponds to a new object.

10 Claims, 19 Drawing Sheets

(56) References Cited

U.S. PATENT DOCUMENTS

| | | | | |
|---|---|---|---|---|
| 9,111,172 B2* | 8/2015 | Noda | ............... | G06K 9/6203 |
| 9,117,147 B2* | 8/2015 | Shet | ............... | G06T 7/208 |
| 9,269,012 B2* | 2/2016 | Fotland | ............... | G06K 9/3241 |
| 9,405,974 B2* | 8/2016 | Bernal | ............... | G06K 9/00711 |
| 2009/0030683 A1* | 1/2009 | Williams | ............... | G10L 15/22 |
| | | | | 704/236 |
| 2013/0142432 A1* | 6/2013 | Wood | ............... | G06T 7/208 |
| | | | | 382/195 |
| 2014/0161319 A1* | 6/2014 | Miyano | ............... | G06T 7/204 |
| | | | | 382/103 |
| 2015/0302258 A1* | 10/2015 | Umezaki | ............... | G08G 1/166 |
| | | | | 382/103 |
| 2015/0348409 A1* | 12/2015 | Lykkja | ............... | G01S 19/14 |
| | | | | 342/357.52 |
| 2016/0019700 A1* | 1/2016 | Maggio | ............... | G06T 7/20 |
| | | | | 382/103 |
| 2016/0035098 A1* | 2/2016 | Ikoma | ............... | G06T 7/20 |
| | | | | 382/103 |

\* cited by examiner

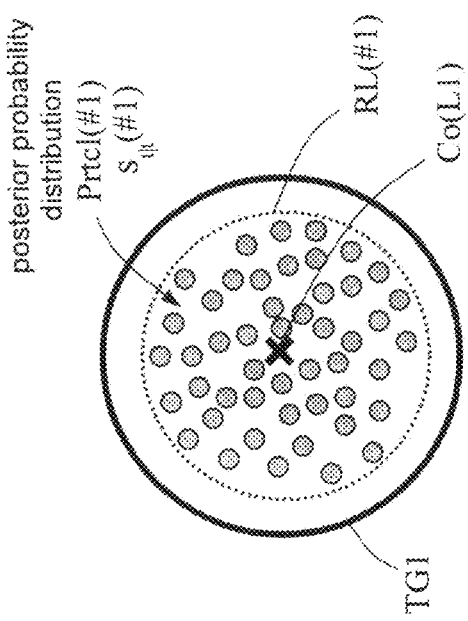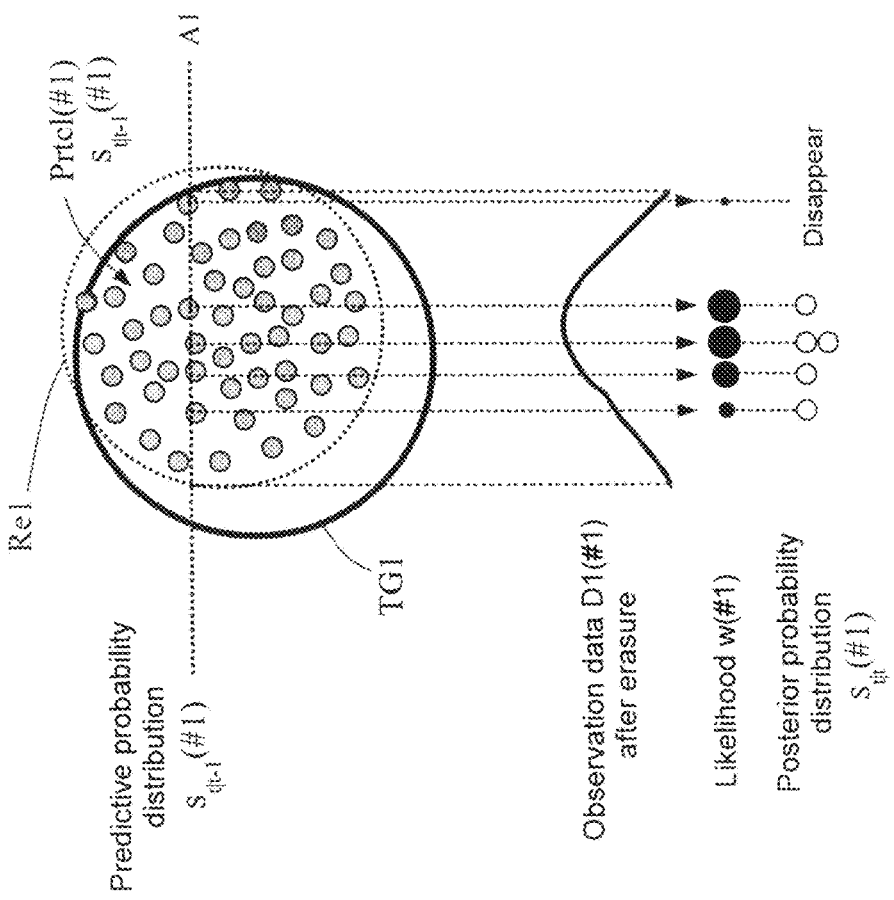
FIG.7B
FIG.7A

STATE ESTIMATION APPARATUS, STATE ESTIMATION METHOD, AND INTEGRATED CIRCUIT

This application claims priority to Japanese Patent Application No. 2014-065876 filed on Mar. 27, 2014, the entire disclosure of which is hereby incorporated herein by reference (IBR).

BACKGROUND OF THE INVENTION

Field of the Invention

The present invention relates to a technique for estimating the state of an observable event using time-series filtering, and particularly to, for example, a technique for tracking objects in a moving image using time-series filtering.

Description of the Background Art

Techniques for estimating the internal state of an observation target, changing from moment to moment, may use time-series filtering. With a state vector $x_t$ indicating the internal state of an object at time t and an observation vector $y_t$ indicating a feature observed at time t, time-series filtering enables an internal state $x_t$ of a directly unobservable object to be estimated by using the observation vector $y_t$ obtained through observation.

More specifically, time-series filtering is a technique for determining a conditional probability distribution $p(x_t|y_{1:t})$ of a state series $x_{0:t} = \{x_0, x_1, \ldots, x_t\}$ using the state space models below, when an observation series (a set of observation vectors before time t) $y_{1:t} = \{y_1, y_2, \ldots, y_t\}$ is given.

System model: $x_t \sim f(x_t|x_{t-1})$

Observation model: $y_t \sim h(y_t|x_t)$

With a system noise $v_t$ and an observation noise $w_t$, the system model showing the internal state of an object and the observation model formed by observing the object can be expressed as follows:

the system model showing the internal state of an object:
$x_t = f(x_{t-1}, v_t)$ the observation model formed by observing the object:
$y_t = h(x_t, w_t)$ where $f(x_{t-1}, v_t)$ is a state transition function indicating a change in the state between time t−1 and time t, and $h(x_t, w_t)$ is an observation vector obtained in the state $x_t$.

In this case, the one-step ahead predict is written as the formula below.

$$p(x_t|y_{1:t-1}) = \int p(x_{t-1}|y_{1:t-1}) f(x_t|x_{t-1}) dx_{t-1} \quad \text{Formula 1}$$

Based on Bayes' Law, the posterior probability distribution $p(x_t|y_{1:t})$ at time t is written as the formula below.

$$p(x_t, y_{1:t}) = \frac{h(y_t | x_t) p(x_t | y_{1:t-1})}{p(y_t | y_{1:t-1})} \quad \text{Formula 2}$$

In this formula, $h(y_t|x_t)$ is a likelihood (a probability for obtaining an observation vector $y_t$ in the state $x_t$), and $p(x_t|y_{1:t-1})$ is a predictive probability distribution.

One practical example of time-series filtering is particle filtering. Particle filters represent the distribution of probabilities of the internal state of an observation target as the distribution of particles, and use the distribution of posterior probabilities of the state at the current time step as the distribution of prior probabilities of the state at the next time step. With particle filtering, the likelihood is calculated by comparing a template observation estimated from the state of particles indicating the distribution of prior probabilities (a set of samples generated in accordance with the prior probability distribution) (predictive samples) with an actual image (an actual observation) obtained at the next time step.

Particle filtering estimates the posterior probability distribution of particles from the calculated likelihoods and the prior probability distribution.

Particle filtering uses the above processing performed repeatedly at each subsequent time step to successively estimate the dynamically changing state of an observation target (e.g., a tracking target).

Particle filtering involves the processing (1) to (4) below, in which M is the number of particles (M is a natural number) and $1 \le i \le M$ (i is an integer).

(1) Generating Particles (One-step Ahead Prediction)

For each sample (each particle), the processing corresponding to the formula below is performed to generate a predictive sample at time t. More specifically, the probability distribution predicted in accordance with the system model (state transition function) is obtained from the posterior probability distribution at time t−1 (the probability distribution of the internal state of an observation target at time t−1). In more detail, each predictive sample is generated from the corresponding sample (particle) at time t−1 through transition in accordance with the system model f.

$$xa_t^{(i)} \sim f(x_t | x_{t-1}^{(i)})$$

$$xa_t = \{xa_t^{(1)}, xa_t^{(2)}, xa_t^{(3)}, \ldots, xa_t^{(M)}\}$$

where $xa_t$ is a predictive (estimated) vector of a state vector $x_t$ calculated by a state transition function $f(\ )$.

(2) Calculating Weights (Calculating Likelihoods)

For each predictive sample generated in processing (1), the processing corresponding to the formula below is performed to calculate a weight (likelihood). More specifically, the probability (likelihood) to obtain the observation vector yt is estimated in accordance with the observation model h.

$$wa_t^{(i)} \sim h(y_t | x_{at}^{(i)})$$

$$wa_t = \{wa_t^{(1)}, wa_t^{(2)}, wa_t^{(3)}, \ldots, wa_t^{(M)}\}$$

where $wa_t$ is a predictive (estimated) vector of a weight (likelihood) $w_t$ (a set of predictive likelihoods) calculated by a function $h(\ )$.

(3) Resampling

At the ratio proportional to the weight (likelihood) $wa_t^{(i)}$, M particles are sampled without changing the total number of the particles (the particle $xa_t^{(i)}$ is sampled). The posterior probability distribution at time t (the probability distribution of the internal state of the observation target at time t) is obtained from the sampled M particles.

(4) The time t is incremented by one step, and the processing returns to (1). The posterior probability distribution obtained in processing (3) (the posterior probability distribution at time t) is used as the prior probability distribution at the next time step (time t+1).

As described above, particle filtering allows the estimation of parameters indicating the changing state of the observation target, changing from moment to moment, by repeatedly predicting the prior probability distribution of parameters indicating the state of the observation target and calculating the posterior probability distribution. Such particle filtering may be used in tracking the position of an object in a moving image. In tracking the position of an object with particle filtering, parameters indicating the position of an object may include parameters indicating the state of a tracking target (an example of an observation target). Particle filtering includes comparing observations estimated from parameters indicating the position of the object (predictive samples) with actual observations (e.g., an image captured by a camera) to calculate likelihoods, and resampling particles based on the calculated likelihoods to obtain the posterior probability distribution of parameters indicating the state of the observation target (see, for example, Patent Literature 1: Japanese Unexamined Patent Publication No. 2012-234466).

Techniques using particle filtering have been developed to track multiple objects (targets). For example, Non-patent Literature 1 describes a technique for tracking multiple objects (targets) with high accuracy using particle filters (N. Ikoma, H. Hasegawa, and Y. Haraguchi, "Multi-target tracking in video by SMC-PHD filter with elimination of other targets and state dependent multi-modal likelihoods," Information Fusion (FUSION), 2013 16th International Conference, July 2013, pp. 588-595).

To track multiple objects with high accuracy, the technique described in Non-patent Literature 1 assigns a distinguishable set of particles to each different object to be tracked. More specifically, for example, particles for tracking an object with an object number 1 are each labeled with an integer indicating the object number 1, whereas particles for tracking an object with an object number 2 are each labeled with an integer indicating the object number 2. More specifically, with the technique described in Non-patent Literature 1, an object with an object number k (k is an integer) is tracked through the particle filtering process described above using particles labeled with an integer indicating the object number k. With the technique described in Non-patent Literature 1, each object being tracked is given an integer other than 0 as its object number.

The technique described in Non-patent Literature 1 adds particles having an object number 0, and performs particle filtering using the newly added particles with the object number 0 to detect a new object. In more detail, with the technique described in Non-patent Literature 1, an image resulting from erasing an area occupied by the object being tracked (the object being tracked by using particles each having an integer other than 0 as its object number) is generated. The generated image then undergoes particle filtering using particles with the object number 0 to detect a new object. This processing will now be described with reference to FIGS. 19A and 19B.

FIGS. 19A and 19B are diagrams describing the processing of tracking and detecting, for example, red objects through particle filtering from an extracted-feature image, or an image representing an extracted image feature quantity corresponding to redness extracted from a captured image. In more detail, FIG. 19A is a diagram describing the processing of tracking two objects (red objects) each having high redness by using particles. FIG. 19B is a diagram describing the processing for detecting a new object by using particles from an object-erased image, which is an image resulting from erasing image areas corresponding to the currently-tracked objects.

As shown in FIG. 19A, the technique described in Non-patent Literature 1 uses particles Prtc1(TG1) for tracking an object TG1 and particles Prtc1(TG2) for tracking an object TG2. In FIG. 19A, the particles are indicated by small dots. Particles (a set of particles) within an area Re1 are labeled with Prtc1(TG1). The particles Prtc1(TG1) are used to track the object TG1. In FIG. 19A, a set of particles within an area Re2 are labeled with Prtc1(TG2). The particles Prtc1(TG2) are used to track the object TG2.

With the technique described in Non-patent Literature 1, the area Re1 for detecting the object TG1 is determined at time t based on the distribution of particles Prtc1(TG1) shown in FIG. 19A (the posterior probability distribution at time t). Likewise, the area Re2 for detecting the object TG2 is determined based on the distribution of particles Prtc1 (TG2) shown in FIG. 19A (the posterior probability distribution at time t). The areas Re1 and Re2 are then eliminated from the image to generate an object-erased image. The generated object-erased image then undergoes particle filtering using particles Prtc1(TG0) with the object number 0 to detect a new object.

In FIG. 19B, the particles Prtc1(TG0) for new object detection are within an area R1_rest, which is an area remaining after the area Re1 is erased from the area corresponding to the object TG1 in FIG. 19A. The technique described in Non-patent Literature 1 erroneously determines that the area R1_rest corresponds to a new object. In other words, when an area occupied by a currently-tracked object is erased incompletely, the technique described in Non-patent Literature 1 erroneously determines that the remaining part of the area corresponding to the currently-tracked object corresponds to a new object as shown in FIG. 19B. In the example shown in FIG. 19B, the area R1_rest, which is a part of the area occupied by the object TG1, is erroneously determined to correspond to a new object (a newly detected object).

In view of the above problems, it is an object of the present invention to provide a state estimation apparatus, a program, and an integrated circuit that allow appropriate estimation of the internal state of an observation target by calculating likelihoods from observation data, and enable appropriate tracking of multiple objects in a moving image, as well as appropriate detection of a new object and adding of the detected new object as a tracking target.

SUMMARY

To solve the above problems, a first aspect of the invention provides a state estimation apparatus for tracking a plurality of objects. The state estimation apparatus includes an observation obtaining unit, a labeling unit, an object information management unit, a prediction unit, a likelihood obtaining unit, a posterior probability distribution estimation unit, and a prior probability distribution output unit.

The observation obtaining unit obtains, at predetermined time intervals, an observation image that is observation data obtained from an observable event, and obtains an extracted-feature image representing a predetermined feature quantity extracted from the observation image.

The labeling unit extracts a closed image area from the observation image obtained by the observation obtaining unit, and adds a label number to the extracted area to generate a label image.

The object information management unit adds an object number to each target object to be tracked, and manages the object number added to each target object.

The prediction unit performs, for each object that is currently being tracked, prediction using posterior probability distribution data, and generates predictive probability distribution data for each currently-tracked object. The posterior probability distribution data indicates a probability distribution of an internal state of the object at a preceding time t−1. The predictive probability distribution data indicates a probability distribution of an internal state of the object at a current time t.

The likelihood obtaining unit obtains, for each object determined as currently being tracked at the preceding time t−1, particles based on the predictive probability distribution data, determines an area to be erased from the extracted-feature image based on the obtained particles to generate an object-erased image for tracking or an object-erased image for new object detection. The object-erased image for tracking is an image from which an area corresponding to an object other than a processing target object selected from the currently-tracked objects has been erased. The object-erased image for new object detection is an image from which an area corresponding to each of the currently-tracked objects has been erased.

The likelihood obtaining unit also generates particles for new object detection, uses the particles for new object detection to process the object-erased image to obtain a new object candidate area, and determines whether the new object candidate area corresponds to a new object that is to be a new tracking target at the current time t based on the obtained new object candidate area and the label image to determine a target object to be tracked at the time t.

The likelihood obtaining unit also calculates a final likelihood based on a likelihood that is calculated for each object determined to be a tracking target object at the time t by using the particles generated based on the predictive probability distribution data to process the object-erased image, and updates the predictive probability distribution data obtained by the prediction unit based on the calculated final likelihood to generate updated probability distribution data.

A posterior probability distribution estimation unit estimates, for each object determined to be a tracking target object at the time t, posterior probability distribution data for a state of the event from the updated probability distribution data and the final likelihood obtained by the likelihood obtaining unit.

The prior probability distribution output unit outputs the prior probability distribution data based on the posterior probability distribution data estimated by the posterior probability distribution estimation unit as prior probability distribution data at a next time t+1.

BRIEF DESCRIPTION OF THE DRAWINGS

FIGS. 7A and 7B are diagrams describing a likelihood calculating process and a posterior probability distribution data obtaining process.

DESCRIPTION OF THE PREFERRED EMBODIMENTS

First Embodiment

A first embodiment will now be described with reference to the drawings.

1.1 Structure of State Estimation Apparatus

Figure 1:
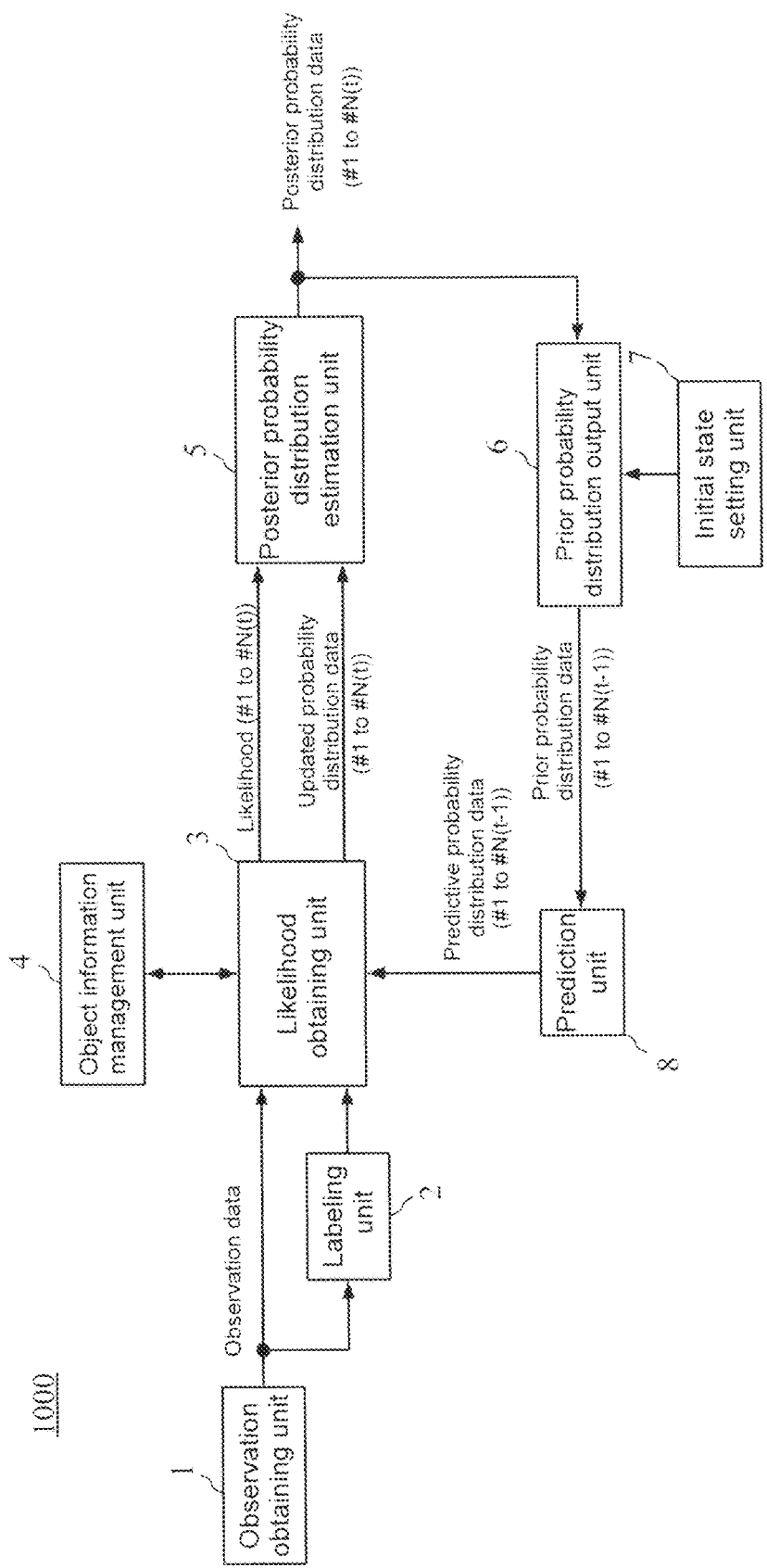
FIG. 1 is a schematic block diagram of a state estimation apparatus 1000 according to a first embodiment.

FIG. 1 is a schematic block diagram of a state estimation apparatus 1000 according to the first embodiment.

Figure 2:
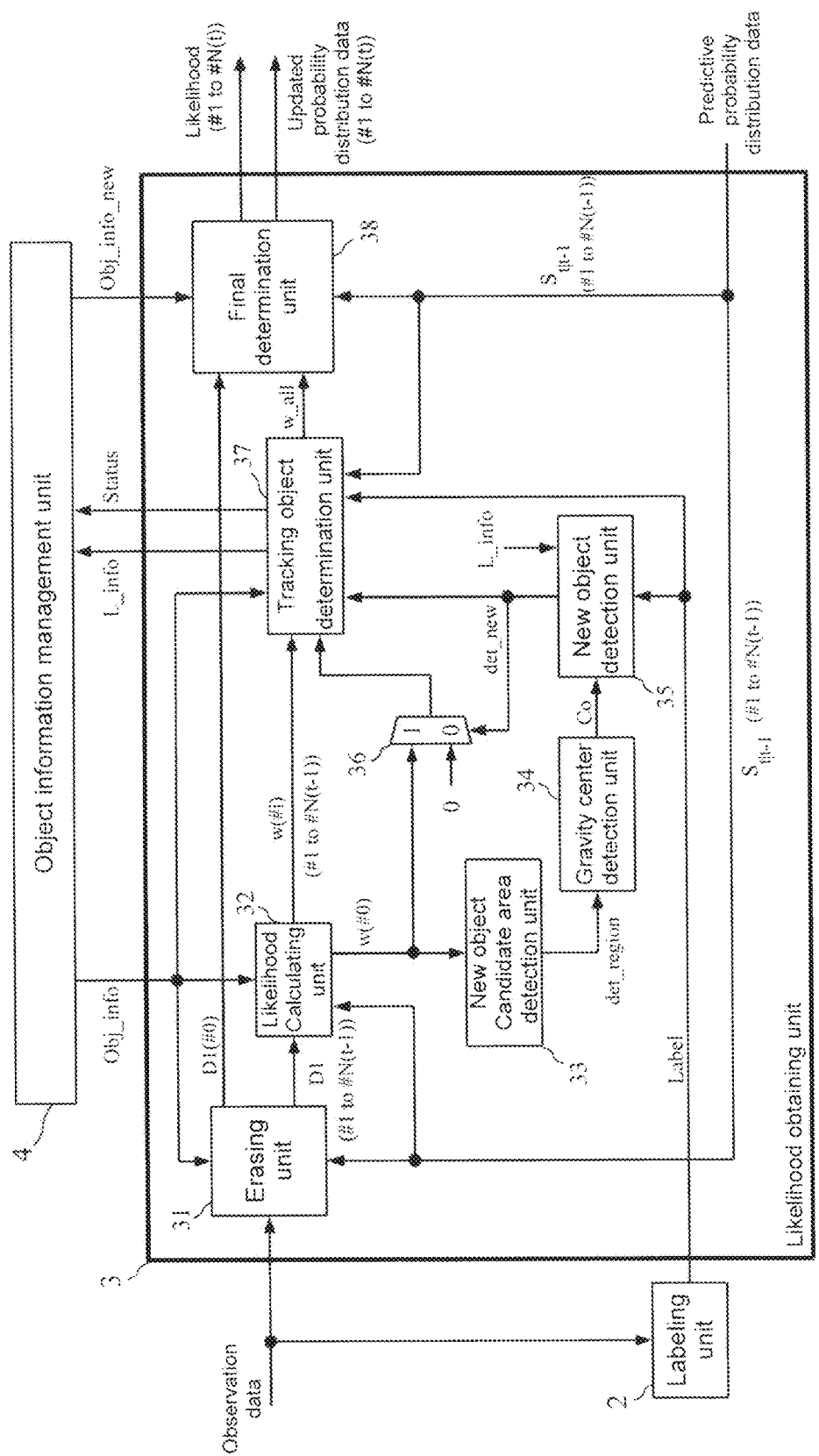
FIG. 2 is a schematic block diagram of a labeling unit 2, a likelihood obtaining unit 3, and an object information management unit 4 according to the first embodiment.

FIG. 2 is a schematic block diagram of a labeling unit 2, a likelihood obtaining unit 3, and an object information management unit 4 according to the first embodiment.

As shown in FIG. 1, the state estimation apparatus 1000 includes an observation obtaining unit 1, a labeling unit 2, a likelihood obtaining unit 3, an object information management unit 4, a posterior probability distribution estimation unit 5, a prior probability distribution output unit 6, an initial state setting unit 7, and a prediction unit 8.

The observation obtaining unit 1 obtains observation data, and outputs the obtained observation data to the labeling unit 2 and the likelihood obtaining unit 3. The observation data obtained by the observation obtaining unit 1 is, for example, an extracted-feature image, which is an image representing a predetermined image feature quantity extracted from an image captured by an imaging apparatus (captured image).

The labeling unit 2 receives observation data (e.g., an extracted-feature image) output from the observation obtaining unit 1, and adds a label (label number) to a detected object in the observation data (the extracted-feature image) to generate distinguishable data. For example, when the observation data is an extracted-feature image, the labeling unit 2 detects areas corresponding to, for example, a plurality of objects in the extracted-feature image through clustering or other processing, and adds a predetermined label number to each of the detected areas. When, for example, two objects are detected through clustering or other processing, the labeling unit 2 generates a label image (an image generated by using the label numbers as pixel values) in which pixels forming an image area corresponding to one object each have a pixel value of 1, pixels forming an image area corresponding to the other object each have a pixel value of 2, and pixels forming an image area with no detected object each have a pixel value of 0. The labeling unit 2 outputs the generated label image to the likelihood obtaining unit 3.

For ease of explanation, the data generated by and output from the labeling unit 2 is the label image.

As shown in FIG. 2, the likelihood obtaining unit 3 includes an erasing unit 31, a likelihood calculating unit 32, a new object candidate area detection unit 33, a gravity center detection unit 34, a new object detection unit 35, a selector 36, a tracking object determination unit 37, and a final determination unit 38.

The erasing unit 31 receives observation data output from the observation obtaining unit 1, predictive probability distribution data output from the prediction unit 8, and information about objects (object information) output from the object information management unit 4. Based on the object information and the predictive probability distribution data, the erasing unit 31 erases an image area (data) corresponding to an object other than a processing target object (an object with an object number #i, where i is an integer other than 0) from the observation data (e.g., an extracted-feature image) to obtain data resulting from the erasure (an object-erased image) D1(#i). The erasing unit 31 outputs the obtained object-erased image D1(#i) to the likelihood calculating unit 32.

In the above example, D1(#i) indicates data resulting from erasing the area corresponding to the object other than the object with the object number #i (object-erased image). For example, the erasing unit 31 replaces the pixel values of pixels included in the image area corresponding to the object other than the object with the object number #i of the observation data with 0 to generate the object-erased image D1(#i).

When the object information output from the object information management unit 4 indicates the object number #0, the erasing unit 31 generates object-erased data (object-erased image) D1(#0) by erasing the area corresponding to a currently-tracked object, which will then be used in the processing for new object detection. The erasing unit 31 outputs the generated object-erased data (object-erased image) D1(#0) to the likelihood calculating unit 32. When the object information indicates the object number #0, the erasing unit 31 further outputs the object-erased data (object-erased image) D1(#0) to the final determination unit 38.

The likelihood calculating unit 32 receives the object-erased data (object-erased image) output from the erasing unit 31, the predictive probability distribution data output from the prediction unit 8, and the object information output from the object information management unit 4. The likelihood calculating unit 32 uses the object-erased data (object-erased image) to calculate the likelihood for a target object (an object with an object number #i, where i is an integer other than 0).

In more detail, the likelihood calculating unit 32 obtains the distribution of particles assigned to the object number #i based on the object information and the predictive probability distribution data, and calculates the likelihood w(#i) for the object-erased data (object-erased image) based on the distribution of particles assigned to the object number #i.

The likelihood calculating unit 32 outputs the calculated likelihood w(#i) to the tracking object determination unit 37.

When the object information output from the object information management unit 4 indicates the object number #0, the likelihood calculating unit 32 may newly generate particles (particles with the object number #0) using a random number, which will then be used in the processing for new object detection. In one example, such new particles are generated to achieve uniform distribution of the particles in the object-erased image.

The likelihood calculating unit 32 calculates the likelihood w(#0) for the object-erased data (object-erased image) D1(#0) based on the distribution of particles with the object number #0. The likelihood calculating unit 32 outputs the calculated likelihood w(#0) to the new object candidate area detection unit 33 and the selector 36.

The new object candidate area detection unit 33 receives the likelihood w(#0) output from the likelihood calculating unit 32. The new object candidate area detection unit 33 detects a candidate area for a new object based on the likelihood w(#0), and outputs the detected area det_region to the gravity center detection unit 34.

The gravity center detection unit 34 receives the data det_region representing a candidate area for a new object, which is output from the new object candidate area detection unit 33. The gravity center detection unit 34 calculates the position of the gravity center of the new object candidate area (the gravity center position in the image) based on the data det_region. The gravity center detection unit 34 outputs data Co indicating the calculated gravity center position to the new object detection unit 35.

The new object detection unit 35 receives the data Co indicating the gravity center position output from the gravity center detection unit 34, the data including label numbers (the label image) output from the labeling unit 2, and the currently-tracked object managed by the object information management unit 4, and the label information L_info indicating the label number associated with the currently-tracked object. Based on the data Co indicating the gravity center position in the new object candidate area and the label image, the new object detection unit 35 determines whether the new object candidate area is a new object area or an area remaining after the currently-tracked object area has been erased. The new object detection unit 35 outputs data det_new indicating the determination result to the selector 36 and the tracking object determination unit 37.

The data det_new indicating the determination result is set to 1 (1) when the new object candidate area is determined to be a new object area, and is set to 0 (2) when the new object candidate area is determined not to be a new object area.

The selector 36 receives the likelihood w(#0) output from the likelihood calculating unit 32 and the determination result data det_new output from the new object detection unit 35. The selector 36 outputs the likelihood w(#0) to the tracking object determination unit 37 (1) when the determination result data det_new output from the new object detection unit 35 is set at 1, and outputs the value 0 to the tracking object determination unit 37 (2) when the determination result data det_new output from the new object detection unit 35 is set at 0.

In the case (2), the selector 36 may output no data to the tracking object determination unit 37.

The tracking object determination unit 37 receives the likelihood w(#i) output from the likelihood calculating unit 32, the output from the selector 36, the determination result data det_new output from the new object detection unit 35, the object information output from the object information management unit 4, the predictive probability distribution data output from the prediction unit 8, and the label image output from the labeling unit 2.

The tracking object determination unit 37 normalizes the input likelihood w(#i), or the sum of the likelihood w(#i) and the likelihood w(#0) to a predetermined value (e.g., to 1), and calculates the sum of likelihoods for each object number by using the likelihood obtained through the normalization (referred to as the likelihood w_all).

(1) When the calculated sum of likelihoods exceeds a predetermined threshold th1, the tracking object determination unit 37 sets the status to Survive for continuing the process for tracking the object with the currently processed object number. (2) When the calculated sum of likelihoods does not exceed the predetermined threshold th1, the tracking object determination unit 37 sets the status to Discard for stopping the process for tracking the object with the currently processed object number. The tracking object determination unit 37 refers to the label image (label number) output from the labeling unit 2, and associates the object determined to continue the tracking process with the corresponding label number. This generates label information L_info. The tracking object determination unit 37 then outputs the generated label information L_info to the object information management unit 4.

When the determination result data det_new is set at 1, the tracking object determination unit 37 further performs the determination described below. (1) When the sum of the normalized likelihoods w'(#0) obtained by normalizing the likelihood w(#0) exceeds a predetermined threshold th2, the tracking object determination unit 37 determines that a new object has been detected and sets the status to FoundNewTarget. (2) When the sum of the normalized likelihoods w'(#0) obtained by normalizing the likelihood w(#0) does not exceed the predetermined threshold th2, the tracking object determination unit 37 determines that no new object has been detected, and sets the status to NotFound.

As described above, the tracking object determination unit 37 sets the status for each object number, and outputs information about the set status to the object information management unit 4.

The tracking object determination unit 37 outputs the likelihood w_all obtained through the normalization to the final determination unit 38.

The final determination unit 38 receives the object-erased data (object-erased image) D1(#0) output from the erasing unit 31, the predictive probability distribution data output from the prediction unit 8, the likelihood w_all obtained through the normalization output from the tracking object determination unit 37, and the new object information output from the object information management unit 4. Based on the new object information, the final determination unit 38 retains likelihoods for objects to be tracked (including a new object to be tracked) from the normalized likelihood w_all, and normalizes the retained likelihoods in a manner that the sum of the retained likelihoods becomes a predetermined value (e.g., to 1), and determines a final likelihood for each object number by using the likelihood obtained through the normalization. The final determination unit 38 outputs the determined final likelihood to the posterior probability distribution estimation unit 5.

Based on the new object information, the final determination unit 38 further updates the predictive probability distribution data in a manner to retain only the predictive probability distribution data for objects to be tracked (including a new object to be tracked). The final determination unit 38 then outputs the updated predictive probability distribution data to the posterior probability distribution estimation unit 5 as the updated probability distribution data.

The object information management unit 4 receives information about the status output from the tracking object determination unit 37, and manages the input status for each object (for each object number). The object information management unit 4 further outputs information about each object to the erasing unit 31, the likelihood calculating unit 32, and the tracking object determination unit 37. The object information management unit 4 determines a tracking target object based on the status information input from the tracking object determination unit 37, and outputs information about the tracking target object to the final determination unit 38 as new object information.

The posterior probability distribution estimation unit 5 receives the likelihood (likelihood data) for each object number and the updated probability distribution data (the updated predictive probability distribution data) for each object number output from the likelihood obtaining unit 3. The posterior probability distribution estimation unit 5 estimates (obtains) the posterior probability distribution (posterior probability distribution data) for each object number based on the likelihood (likelihood data) and the updated probability distribution data. The posterior probability distribution estimation unit 5 outputs the posterior probability distribution (posterior probability distribution data) obtained for each object number to the prior probability distribution output unit 6.

The prior probability distribution output unit 6 receives the initially set data output from the initial state setting unit 7 and the posterior probability distribution (posterior probability distribution data) output from the posterior probability distribution estimation unit 5. In the initial state, the prior probability distribution output unit 6 generates prior probability distribution (prior probability distribution data) based on the initially set data output from the initial state setting unit 7, and outputs the generated prior probability distribution (prior probability distribution data) to the prediction unit 8. The prior probability distribution (prior probability distribution data) is generated for each object number.

In states other than the initial state, the prior probability distribution output unit 6 outputs the posterior probability distribution (posterior probability distribution data) at time t, which is output from the posterior probability distribution estimation unit 5, to the prediction unit 8 as the prior probability distribution (prior probability distribution data) at the next time t+1.

The initial state setting unit 7 stores data (an initial value) for generating the prior probability distribution (the prior probability distribution) in the initial state, and outputs the data (the initial value) to the prior probability distribution output unit 6.

The prediction unit 8 receives the prior probability distribution data (the prior probability distribution data for each object number) output from the prior probability distribution output unit 6. The prediction unit 8 obtains, for each object number, the probability distribution data predicted in accordance with the system model (state transition function) from the prior probability distribution data generated for each object number. The prediction unit 8 outputs the obtained probability distribution data to the likelihood obtaining unit 3.

1.2 Operation of State Estimation Apparatus

The operation of the state estimation apparatus 1000 with the above-described structure will now be described.

A process for tracking two red objects will be described as an example.

Figure 3:
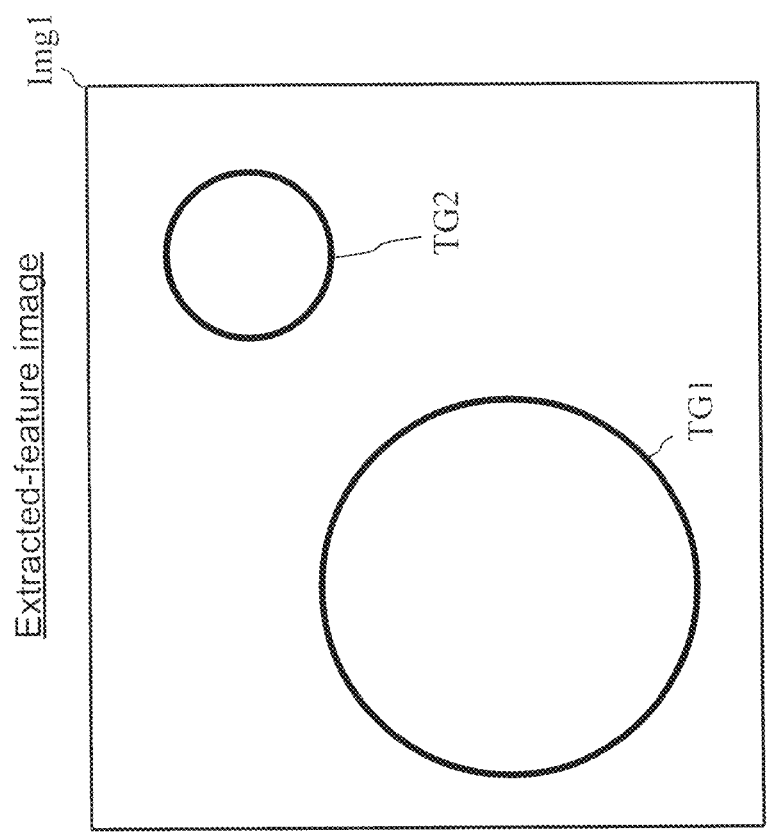
FIG. 3 is a schematic diagram showing observation data at time t.

FIG. 3 schematically shows observation data at time t. In more detail, FIG. 3 shows an image Img1 (an extracted-feature image Img1) representing extracted areas having high redness obtained at time t by the observation obtaining unit 1. The image Img1 includes an area TG1, which is an image area corresponding to a first red object, and an area TG2, which is an image area corresponding to a second red object. The object corresponding to the area TG1 is given the object number #1. The object corresponding to the area TG2 is given the object number #2.

The observation obtaining unit 1 generates the image Img1 (extracted-feature image Img1) representing areas having high redness extracted from, for example, a captured image including pixels each having red, green, and blue (RGB) components. For example, the observation obtaining unit 1 uses the R-component value, the G-component value, and the B-component value of each pixel included in the captured image, and obtains an output pixel value with the formula below.

$$Dout=R\times(255-G)\times(255-B)/(1+R+G+B)$$

where Dout is an output pixel value, R is an R-component value, G is a G-component value, and B is a B-component value.

The observation obtaining unit 1 uses the obtained pixel value as the pixel value of each pixel to generate the image Img1 (extracted-feature image Img1) including the extracted areas having high redness. The captured image is 8-bit image data. The R-component value, the G-component value, and the B-component value of each pixel are values ranging from 0 to 255.

The state vector $x_t(\#i)$ represents the internal state of the object with the object number #i (i is an integer), which is an observation target (tracking target), at time t. The observation vector $y_t(\#i)$ represents the feature observed at time t. The set of samples (the set of particles) $S_{t|t-1}(\#i)$ generated in accordance with the prior probability distribution $p(x_t(\#i)|y_{t-1}(\#i))$ is written as $$S_{t|t-1}(\#i)=\{s_{t|t-1}^{(1)}(\#i),s_{t|t-1}^{(2)}(\#i),\ldots,s_{t|t-1}^{(M)}(\#i)\}.$$

The set of samples (the set of particles) $S_{t|t}(\#i)$ generated in accordance with the posterior probability distribution $p(x_t(\#i)|y_t(\#i))$ is written as $$S_{t|t}=\{s_{t|t}^{(1)}(\#i),s_{t|t}^{(2)}(\#i),\ldots,s_{t|t}^{(M)}(\#i)\}.$$

The j-th sample (particle)) $s_{t|t}^{(j)}(\#i)$ in the set of samples (the set of particles) $S_{t|t}(\#i)$ is vector data having, as its internal variables, the coordinate position $(Xt^{(j)}(\#i), Yt^{(j)}(\#i))$ of the j-th sample (particle) in the image and the radius $Rt^{(j)}(\#i)$ of the circular image area centered on the coordinate position $(Xt^{(j)}(\#i), Yt^{(j)}(\#i))$. More specifically, the sample (particle) $s_{t|t}^{(j)}(\#i)$ is written as $$s_{t|t}^{(j)}(\#i)=(Xt^{(j)}(\#i),Yt^{(j)}(\#i),Rt^{(j)}(\#i)).$$

The state estimation apparatus 1000 continues tracking the object with the object number #1 and the object with the object number #2 at time t−1 (e.g., the time step preceding the time t by one frame). More specifically, the object with the object number #1 and the object with the object number #2 are also detected in the extracted-feature image obtained at time t−1, and these objects undergo the tracking process.
Processing at Time t0:
1.2.1 Labeling Process At time t, the extracted-feature image Img1 shown in FIG. 3 is input into the labeling unit 2.

Figure 4:
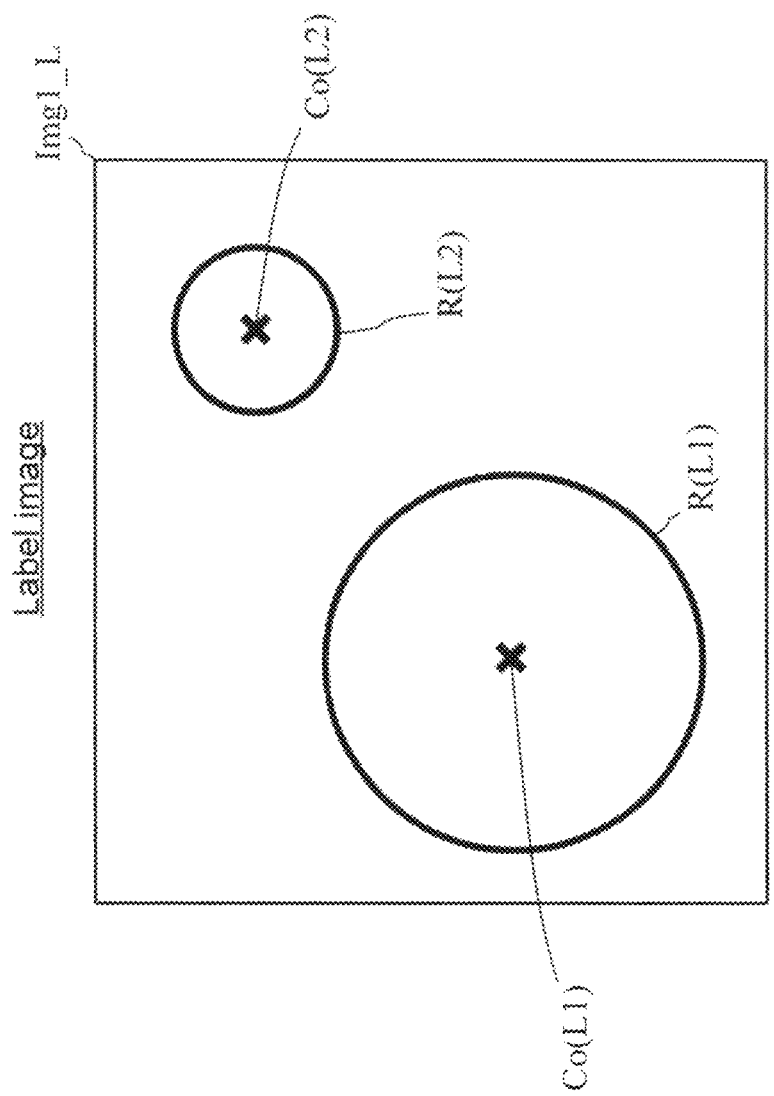
FIG. 4 shows a label image Img_L.

The labeling unit 2 detects an image area (a closed area) that is a part of the extracted-feature image Img1 through clustering or other processing. The labeling unit 2 then adds a label number to the detected image area. For the extracted-feature image Img1 shown in FIG. 3, the labeling unit 2 detects the areas TG1 and TG2. The labeling unit 2 adds the label number L1 to the area TG1, and adds the label number L2 to the area TG2. In one example, the labeling unit 2 sets the pixel value of each pixel included in the area TG1 to 1 (the value indicating the label number L1) and sets the pixel value of each pixel included in the area TG2 to 2 (the value indicating the label number L2), and sets the pixel value of each pixel included in the other areas to 0 (the value indicating that no label number has been added) to generate a label image, and outputs the generated label image to the likelihood obtaining unit 3. FIG. 4 shows the label image Img1_L generated in this manner. FIG. 4 additionally shows a gravity center Co(L1) of the image area having the label number L1, and a gravity center Co(L2) of the image area having the label number L2.

The data having label numbers may be in any format other than the format used for the above label image. For ease of explanation, the labeling unit 2 may generate the above label image and output the label image to the likelihood obtaining unit 3 in the example described below.

At time t, the prior probability distribution output unit 6 outputs the posterior probability distribution data for the object with the object number 1 (hereafter, the object #1) obtained at time t−1 to the prediction unit 8 as the prior probability distribution (prior probability distribution data) for the object #1 at time t. The prior probability distribution output unit 6 also outputs the posterior probability distribution data of the object with the object number 2 (hereafter, object #2) obtained at time t−1 to the prediction unit 8 as the prior probability distribution (prior probability distribution data) of the object #2 at time t.

The prediction unit 8 performs prediction for each object number.

In detail, the prediction unit 8 performs prediction for each object number based on the set of particles $s_{t-1|t-1}(\#i)$ generated by the prior probability distribution output unit 6 in accordance with the prior probability distribution (prior probability distribution data) at time t−1. This prediction generates the set of particles $s_{t-1|t-1}(\#i)$.

In one example, Gaussian noise using the dynamics of random walks as the underlying assumption is added to the state of each particle included in the set of particles $S_{t-1|t-1}(\#i)$ (this is referred to as the prior probability distribution data $S_{t-1|t-1}(\#i)$) generated in accordance with the prior probability distribution (prior probability distribution data) for the object #i (object with the object number #i) at time t−1. This prediction generates the set of particles $S_{t|t-1}(\#i)$ (this is referred to as the predictive probability distribution data $S_{t|t-1}(\#i)$). More specifically, the set of particles $S_{t|t-1}(\#i)$ resulting from the prediction is obtained by the formula below.

$$s_{t|t-1}^{(i)}(\#i)=f(s_{t-1|t-1}^{(j)}(\#i),vt^{(j)}(\#i))$$

where $vt^{(j)}(\#i)$ is system noise in accordance with the Gaussian distribution, f( ) is a state transition function indicating a change in the state between time t−1 and time t, and $vt^{(j)}$ is system noise.

In more detail, the internal state of the j-th particle in accordance with the prior probability distribution (prior probability distribution data) for the object #i at time t−1 is $(X_{t-1|t-1}^{(j)}(\#i), Y_{t-1|t-1}^{(j)}(\#i), R_{t-1|t-1}^{(j)}(\#i))$, and the internal state of the j-th particle resulting from the prediction is $(X_{t|t-1}^{(j)}(\#i), Y_{t|t-1}^{(j)}(\#i), R_{t|t-1}^{(j)}(\#i))$. Thus, the prediction unit 8 obtains the set of particles $s_{t|t-1}(\#i)$ for the object #i resulting from the prediction as $$X_{t-1}^{(j)}(\#i)=X_{t-1|t-1}^{(j)}(\#i)+\Delta X^{(j)}(\#i),$$

$$Y_{t-1}^{(j)}(\#i)=Y_{t-1|t-1}^{(j)}(\#i)+\Delta Y^{(j)}(\#i), \text{ and}$$

$$R_{t-1}^{(j)}(\#i)=R_{t-1|t-1}^{(j)}(\#i)+\Delta R^{(j)}(\#i),$$

where $\Delta X^{(j)}(\#i)$, $\Delta Y^{(j)}(\#i)$, and $\Delta R^{(j)}(\#i)$ are in accordance with the Gaussian distribution.

The set of particles $s_{t|t-1}(\#i)$ for each object number resulting from the prediction is then output from the prediction unit 8 to the likelihood obtaining unit 3 as the predictive probability distribution data for the object #i.

The erasing unit 31 included in the likelihood obtaining unit 3 subjects the observation data (extracted-feature image) input from the observation obtaining unit 1 to an erasing process, which will now be described with reference to FIG. 5.

Figure 5:
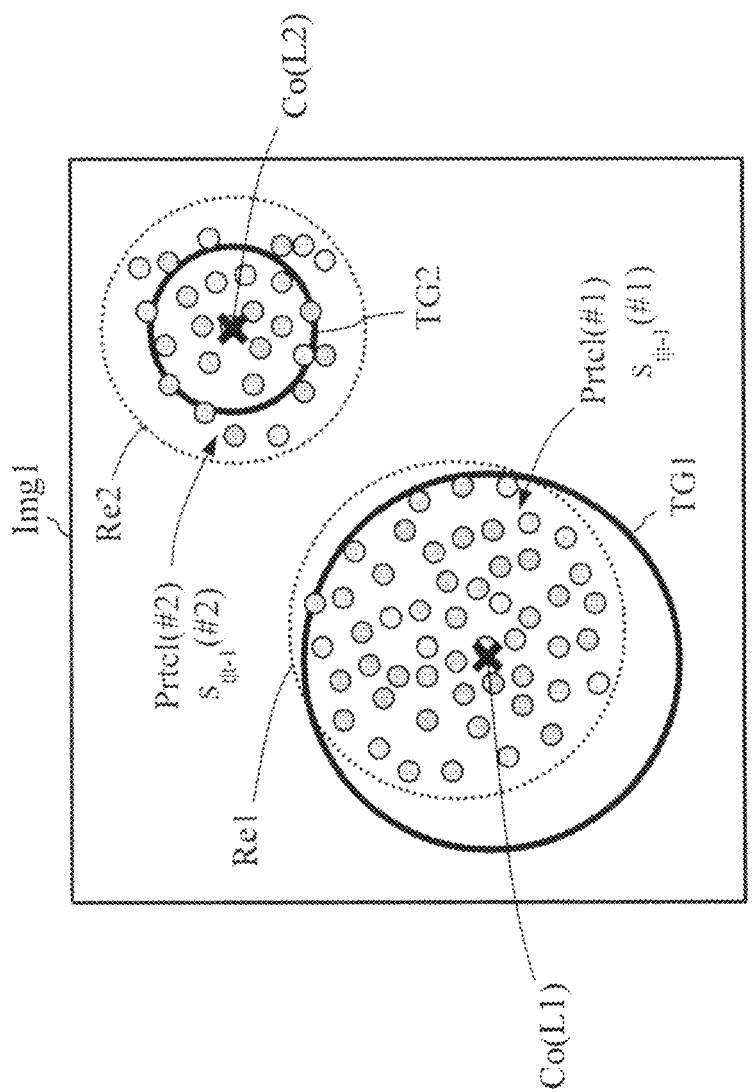
FIG. 5 schematically shows an extracted-feature image Img1 including an area TG1 corresponding to an object with an object number #1, an area TG2 corresponding to an object with an object number #2, a particle set Prtc1(#1) generated based on predictive probability distribution data $S_{t|t-1}(\#1)$ for the object #1, and a particle set Prtc1(#2) (particle set) generated based on predictive probability distribution data $S_{t|t-1}(\#2)$ for the object #2.

FIG. 5 schematically shows the extracted-feature image Img1 including the area TG1 corresponding to the object with the object number #1, the area TG2 corresponding to the object with the object number #2, the particle set Prtc1(#1) generated based on the predictive probability distribution data $S_{t|t-1}(\#1)$ for the object #1, and the particle set Prtc1(#2) generated based on the predictive probability distribution data $S_{t|t-1}(\#2)$ for the object #2.

The object information management unit 4 outputs object information indicating the object numbers #1 and #2 of the processing target objects to the erasing unit 31. The erasing unit 31 performs the erasing process for the objects #1 and #2 based on the object information.

1.2.2 Processing Currently-Tracked Object

Processing a currently-tracked object, or the object #1 in this example, will now be described.

The erasing unit 31 erases an image area corresponding to an object other than the object having the object number #1. More specifically, the erasing unit 31 replaces the pixel value of each pixel included in the image area corresponding to the object other than the object having the object number #1 with 0.

In the example shown in FIG. 5, the image includes only the object #2 as an object other than the object with the object number #1. In this case, the erasing unit 31 erases an area corresponding to the union of the particles with the object number #2. The erasing unit 31 sets, for example, an area of the image occupied by each particle included in the particle set Prtc1(#2) with the object number #2, or sets an area larger than the area occupied by each particle by a predetermined size, and determines an area corresponding to the union of the particle areas as an erasing target area. The erasure area Ret in FIG. 5 is the area determined to be erased (erasing target area) for the object #2.

Figure 6:
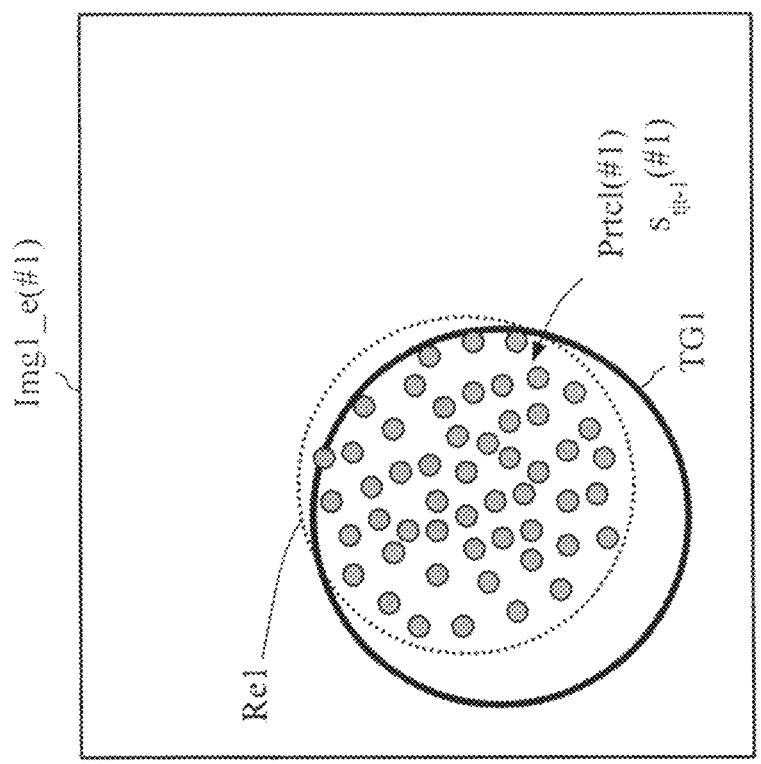
FIG. 6 shows an object-erased image Img1_e(#1).

FIG. 6 shows an object-erased image Img1_e(#1) generated by erasing an image area corresponding to an object other than the object having the object number #1 from the extracted-feature image Img1 shown in FIG. 5.

In FIG. 6, the area TG2 corresponding to the object #2 has been erased completely.

The erasing unit 31 outputs the generated object-erased image for the object #1 to the likelihood calculating unit 32 as data D1(#1).

The likelihood calculating unit 32 calculates the likelihood w(#1) for the object #1 by using the predictive probability distribution data $S_{t|t-1}(\#1)$ for the object #1, and the data D1(#1) (object-erased image Img1_e(#1)) output from the erasing unit 31. This processing will be described with reference to FIGS. 7A and 7B.

FIGS. 7A and 7B are diagrams describing a likelihood calculating process and a posterior probability distribution data obtaining process.

FIG. 7A shows the area TG1 for the object #1 and the particle set Prtc1(#1) for the object #1 extracted from the image shown in FIG. 6, and further shows observation data after the erasure (data D1(#1)), the likelihood w(#1), and the posterior probability distribution data $S_{t|t}(\#1)$ for particles located on a line A1 in FIG. 7A.

FIG. 7B schematically shows the particle set Prtc1(#1) based on the posterior probability distribution data $S_{t|t}(\#1)$.

In FIG. 7A, five particles are located on the line A1. For ease of explanation, the five particles are used in a likelihood calculating process performed by the likelihood calculating unit 32. The likelihood calculating process will now be described.

The likelihood calculating unit 32 calculates the likelihood based on the observation data after the erasure shown in the middle portion of FIG. 7A (data corresponding to the line A1 in the image after the erasure of the extracted-feature image indicating redness), and the distribution of particles. More specifically, the likelihood calculating unit 32 integrates the values of the observation data after the erasure included in the image area occupied by each particle (the pixel values of pixels included in the image area occupied by each particle in the object-erased image), and uses the integrated value as the likelihood for each particle. The likelihoods calculated for the five particles on the line A1 are indicated by black dots in the lower portion of FIG. 7A (where the likelihood w(#1) is shown). A larger black dot indicates a greater likelihood. In the lower portion of FIG. 7A, the likelihoods around the middle have large values.

As described above, the likelihood calculating unit 32 calculates the likelihood w(#1) by using the predictive probability distribution data $S_{t|t-1}(\#1)$, and the observation data D1(#1) after the erasure (the object-erased image Img1_e(#1)).

The calculated likelihood w(#1) is output to the tracking object determination unit 37.

The tracking object determination unit 37 obtains the posterior probability distribution data $S_{t|t}(\#1)$ for the object #1 (the set of particles $S_{t|t}(\#1)$ in accordance with the posterior probability distribution for the object #1) based on the predictive probability distribution data $S_{t|t-1}(\#1)$ for the object #1 and the likelihood w(#1) calculated by the likelihood calculating unit 32.

The tracking object determination unit 37 sets an area of the image occupied by each particle included in the particle set Prtc1(#1) generated based on the posterior probability distribution data $S_{t|t-1}(\#1)$ for the object #1, or sets an area larger than the area occupied by each particle by a predetermined size, and determines an area corresponding to the union of the particle areas as a label determination area RL(#1). The tracking object determination unit 37 further refers to the label image, and calculates the gravity center of an area (a closed area) with the same label number. The tracking object determination unit 37 then determines whether the label determination area RL(#1) includes the center of the gravity of the area (the closed area) given the same label number detected in the label image. This process will be described with reference to FIGS. 7A and 7B.

As shown in the lower portion of FIG. 7A, the tracking object determination unit 37 obtains the posterior probability distribution data $S_{t|t}(\#1)$ for the object #1 based on the predictive probability distribution data $S_{t|t-1}(\#1)$ and the likelihood w(#1) for the object #1. The tracking object determination unit 37 samples particles without changing the total number of the particles in a manner to assign a larger number of particles when each particle has a larger likelihood $w^{(j)}(\#1)$. As a result, the tracking object determination unit 37 obtains the posterior probability distribution data $S_{t|t}(\#1)$ for the object #1 in which particles distant from the center of the area TG are eliminated and a larger number of particles are assigned to positions near the center of the area TG as shown in the lower portion of FIG. 7A.

As shown in FIG. 7B, the posterior probability distribution data $S_{t|t}(\#1)$ for the object #1 includes more particles around the center of the area TG1.

The tracking object determination unit 37 obtains the label determination area RL(#1) as the area RL(#1) shown in FIG. 7B. The tracking object determination unit 37 further determines whether the gravity center of the closed area of the label image is included in the area RL(#1). In the example of FIG. 7B, the closed area detected by the labeling unit 2 matches the area TG1, and thus has the label number L1. The gravity center of this area is at the position (Co(L1)) indicated by a cross mark in FIG. 7B.

In this case, the tracking object determination unit 37 determines that the gravity center Co(L1) of the area with the label number L1 is included in the label determination area RL(#1). The tracking object determination unit 37 outputs information indicating the determination result, or information indicating that the label number L1 is for the object #1, to the object information management unit 4 as label information L_info. The object information management unit 4 stores the label information L_info indicating the determination result, which is output from the tracking object determination unit 37.

The above process may be performed only when the sum of the likelihoods calculated by the likelihood calculating unit 32 (the sum of the likelihoods calculated for the particles) is greater than a predetermined threshold.

The same processing as described above for the object #1 is performed for the object #2.

More specifically, the likelihood calculating unit 32 calculates the likelihood w(#2) by using the predictive probability distribution data $S_{t|t-1}(\#2)$ and the observation data D1(#2) after the erasure (the object-erased image Img1_e (#2)).

The calculated likelihood w(#2) is output to the tracking object determination unit 37.

In the same manner as described above, the tracking object determination unit 37 determines whether the gravity center of the area with the label number added by the labeling unit 2 is included in the label determination area RL(#2) obtained from the posterior probability distribution data $S_{t|t}(\#2)$ for the object #2. In this example, the labeling unit 2 adds the label number L2 to the area TG2, and its gravity center Co(L2) is aligned with the center of the area TG2. In this case, the tracking object determination unit 37 determines that the gravity center Co(L2) in the area having the label number L2 is included in the label determination area RL(#2). The tracking object determination unit 37 then outputs information indicating the determination result, or information indicating that the label number L2 is for the object #2, to the object information management unit 4 as label information L_info. The object information management unit 4 stores the label information L_info indicating the determination result, which is output from the tracking object determination unit 37.

The above process may be performed only when the sum of the likelihoods calculated by the likelihood calculating unit 32 (the sum of the likelihoods calculated for the particles) is greater than a predetermined threshold.

Figure 9:
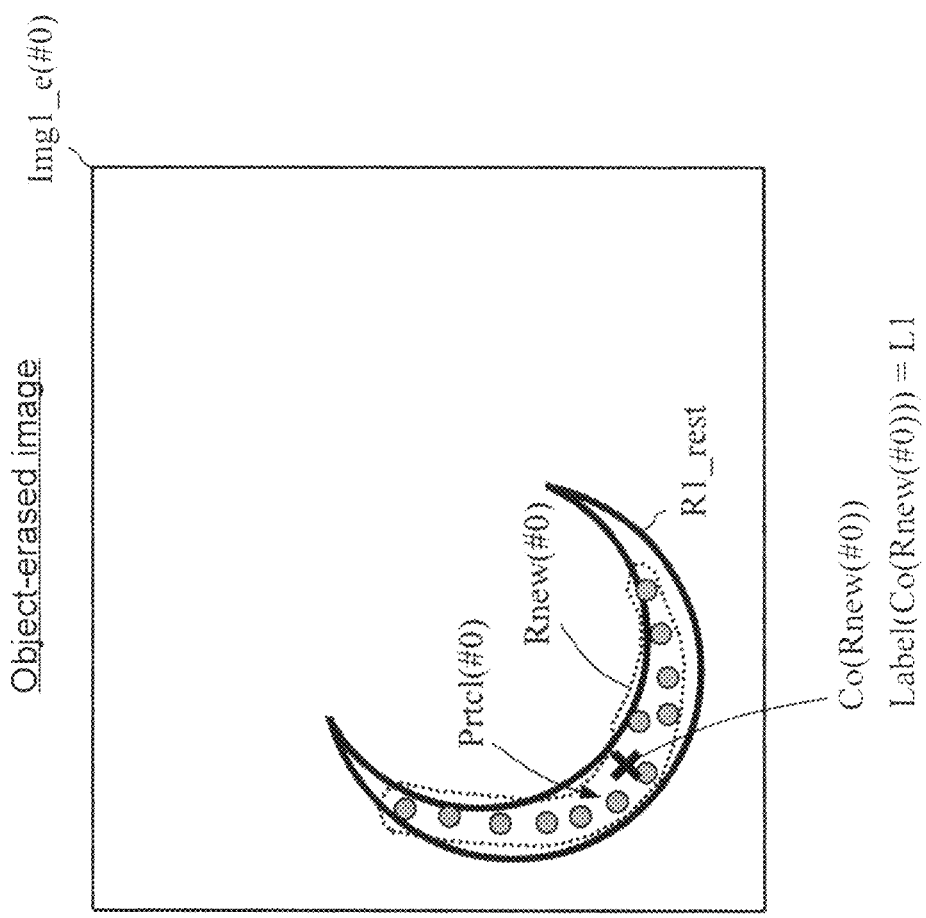
FIG. 9 is a diagram describing a process for detecting a candidate area for a new object from the object-erased image Img1_e(#0).

1.2.3 Process for Detecting New Object (in the example of FIG. 9)

A process for detecting a new object will now be described.

The object information management unit 4 outputs object information indicating that a processing target object has the object number #0 to the erasing unit 31.

The erasing unit 31 performs an erasing process based on the object information from the object information management unit 4 to prepare for new object detection.

The erasing unit 31 generates the data (object-erased image) D1(#0) resulting from erasing the areas corresponding to the currently-tracked objects, which will then be used in the processing for new object detection. In more detail, the erasing unit 31 generates an image (erasure image) by erasing the areas TG1 and TG2 corresponding to the currently-tracked objects #1 and #2 from the extracted-feature image Img1, which is the observation data.

The erasing unit 31 replaces the pixel values of the pixels included in the image areas corresponding to the objects with the object numbers #1 and #2 with 0.

More specifically, the erasing unit 31 erases an area corresponding to the union of the particles with the object number #1 and an area corresponding to the union of the particles with the object number #2. The erasing unit 31 sets, for example, an area of the image occupied by each particle included in the particle set Prtc1(#1) with the object number #1 and an area of the image occupied by each particle included in the particle set Prtc1(#2) with the object number #2, or sets areas larger than the areas occupied by each particle by a predetermined size, and determines areas corresponding to the unions of the particle areas as erasing target areas. The erasure area Re1 in FIG. 5 is the area determined to be erased (erasing target area) for the object #1. The erasure area Re2 in FIG. 5 is the area determined to be an erasing target area for the object #2.

Figure 8:
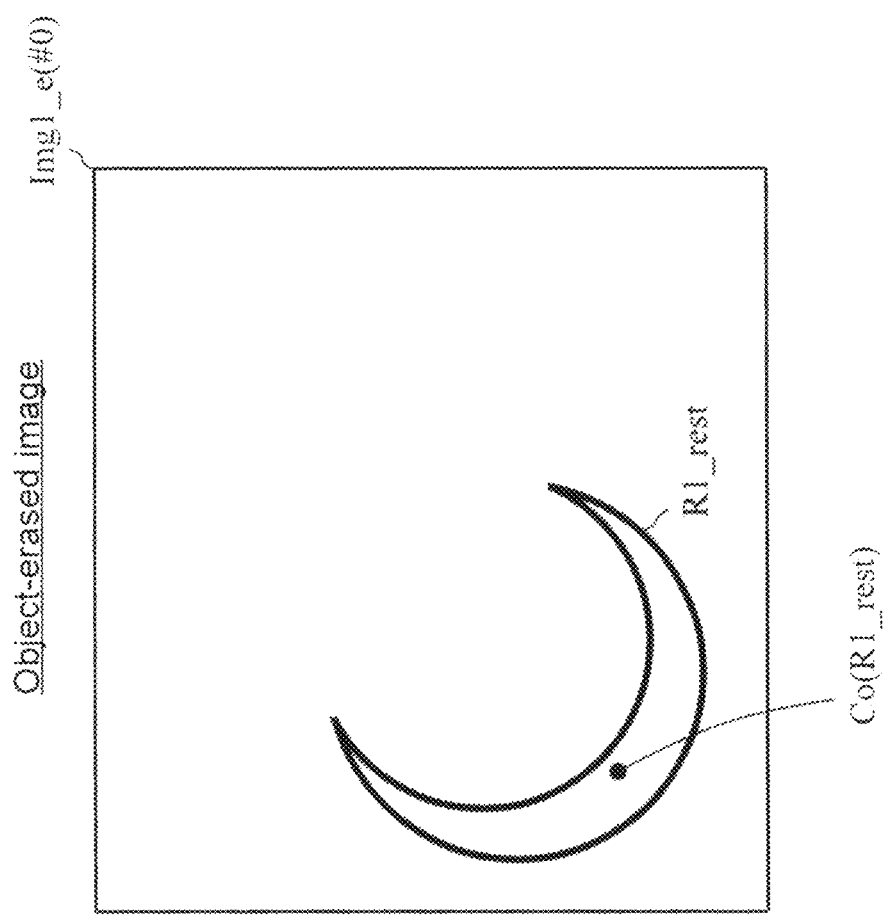
FIG. 8 shows an object-erased image Img1_e(#0).

FIG. 8 shows the object-erased image Img1_e(#0) obtained by erasing the image areas corresponding to objects with the object numbers #1 and #2 (all the objects that are being tracked) from the extracted-feature image Img1 shown in FIG. 5.

In FIG. 8, the area TG2 for the object #2 has been erased completely, whereas a part of the area TG1 for the object #1 remains as the area R1_rest that has not been erased.

The erasing unit 31 outputs the generated object-erased image Img1_e(#0), which is used in detecting a new object, to the likelihood calculating unit 32 as the data D1(#0).

The likelihood calculating unit 32 adds particles for new object detection, and calculates the likelihood by using these particles. For example, the likelihood calculating unit 32 generates new particles (particles with the object number #0) using a random number, and sets the particles for new object detection. In one example, such new particles are generated to achieve uniform distribution of the particles in the object-erased image.

The likelihood calculating unit 32 calculates the likelihood w(#0) for the object-erased image Img1_e(#0) as the observation data (observation model) by using the particles for new object detection. More specifically, the likelihood calculating unit 32 calculates the likelihood w(#0) based on the object-erased image Img1_e(#0) and the distribution of particles for new object detection.

The likelihood w(#0) calculated by the likelihood calculating unit 32 is output to the new object candidate area detection unit 33.

The new object candidate area detection unit 33 detects a candidate area for a new object based on the likelihood w(#0). This process will be described with reference to FIG. 9.

FIG. 9 is a diagram describing a process for detecting a candidate area for a new object for the object-erased image Img1_e(#0).

FIG. 9 shows only particles with which the likelihood is calculated to be equal to or greater than a predetermined value by the likelihood calculating unit 32 (indicated as the particle set Prtc1(#0)). More specifically, particles other than the particles shown in FIG. 9 have a pixel value of 0 in the object-erased image. Using those other particles, the likelihood is calculated to be 0. The particles included in the area R1_rest do not have the pixel value of 0 in the object-erased image. Using those particles included in the area R1_rest, the likelihood is not calculated to be 0 (but is calculated to be a positive value).

The new object candidate area detection unit 33 detects a new object candidate area Rnew(#0) based on the particles shown in FIG. 9 and the likelihood calculated using these particles.

More specifically, the new object candidate area detection unit 33 sets an area of the image occupied by each particle used to yield a positive likelihood value (the particles indicated by small dots in FIG. 9), or sets an area larger than the area occupied by each particle by a predetermined size, and determines (detects) an area corresponding to the union of the particle areas as a new object candidate area Rnew (#0). In FIG. 9, the area Rnew(#0) is the determined (detected) new object candidate area.

The new object candidate area detection unit 33 outputs information about the determined (detected) new object candidate area Rnew(#0) to the gravity center detection unit 34 as data det_region.

The gravity center detection unit 34 detects the gravity center position Co(Rnew(#0)) of the new object candidate area Rnew(#0) detected by the new object candidate area detection unit 33. The gravity center detection unit 34 outputs information about the detected gravity center position Co(Rnew(#0)) to the new object detection unit 35.

The new object detection unit 35 determines whether the label number of a currently-tracked object is at the same coordinate position as the gravity center position Co(Rnew (#0)) of the new object candidate area Rnew(#0) detected by the gravity center detection unit 34 in the label image.

In the example of FIG. 9, the cross mark indicates the gravity center position Co(Rnew(#0)) of the new object candidate area Rnew(#0), and the pixel in the label image Img1_L (the label image Img1_L shown in FIG. 4) at the same coordinate position as the gravity center position has a pixel value of 1 (a value indicating the label number L1). In other words, the new object candidate area Rnew(#0) is the area remaining after the erasure of the currently-tracked object#1 with the label number L1. In this case, the new object detection unit 35 determines that the new object candidate area Rnew(#0) is not an area corresponding to a new object, and sets the determination result data det_new to 0, and outputs the determination result data det_new to the tracking object determination unit 37 and the selector 36. In this case (in the example of FIG. 9), the new object detection unit 35 correctly determines that no new object has been detected.

In response to the determination result data det_new from the new object detection unit 35 indicating 0, the selector 36 outputs 0 to the tracking object determination unit 37. Alternatively, the selector 36 may output no data to the tracking object determination unit 37 in response to the determination result data det_new from the new object detection unit 35 indicating 0.

1.2.4 Tracking Object Determination Process

In response to the determination result data det_new from the new object detection unit 35 indicating 0, the tracking object determination unit 37 determines that no new object has been detected, and finally determines whether the currently-tracked objects #1 and #2 are to be continuously set as tracking objects at time steps subsequent to the current time t. The tracking object determination unit 37 obtains the normalized likelihood w_all for tracking the targets. This process will be described in detail.

The tracking object determination unit 37 normalizes the likelihood w_all in a manner that the sum of the input likelihood w(#1) and the likelihood w(#2) becomes a predetermined value (e.g., to 1), and uses the normalized likelihood w_all to calculate the sum of likelihoods for each object number.

(1) When the calculated sum of the likelihoods exceeds a predetermined threshold th1, the tracking object determination unit 37 sets the status to Survive to continue the tracking process for the object with the current object number. (2) When the calculated sum of the likelihoods does not exceed the predetermined threshold th1, the tracking object determination unit 37 sets the status to Discard to stop the tracking process for the object with the current object number.

When the observation data is the extracted-feature image Img1 shown in FIG. 3, the sum of normalized likelihoods for the object number #1 and the sum of normalized likelihoods for the object number #2 both exceed the threshold th1. The tracking object determination unit 37 sets the status of the object #1 to Survive, and sets the status of the object #2 to Survive. When the observation data is the extracted-feature image Img1 shown in FIG. 3, the threshold th1 is set as a value greater than the sum of normalized likelihoods for the object number #1, and greater than the sum of normalized likelihoods for the object number #2.

The tracking object determination unit 37 refers to the label image (label number) output from the labeling unit 2, and generates the label information L_info indicating the correspondence between each object for which the tracking process is determined to be continued through the above determination process and its associated label number, and outputs the label information L_info to the object information management unit 4. In the above example, the tracking object determination unit 37 outputs information indicating the status Survive of the object #1 and the label number L1 for the object #1, and information indicating the status Survive of the object #2 and the label number L2 for the object #2 to the object information management unit 4.

The object information management unit 4 generates new object information, which is information about an object newly set as a tracking target at time t, based on the information output from the tracking object determination unit 37, and stores the new object information.

The tracking object determination unit 37 outputs the normalized likelihood w_all to the final determination unit 38.

The final determination unit 38 receives the new object information from the object information management unit 4. Based on the new object information, the final determination unit 38 retains likelihoods for objects to be tracked (including a new object to be tracked) from the normalized likelihood w_all, and normalizes the retained likelihoods in a manner that the sum of the retained likelihoods becomes a predetermined value (e.g., to 1), and determines a final likelihood for each object number by using the likelihood obtained through the normalization.

When the observation data is the extracted-feature image Img1 shown in FIG. 3, the normalized likelihood w_all includes only the likelihoods for the objects #1 and #2, which are determined to be tracking targets (no objects with object numbers labeled with Discard are detected by the tracking object determination unit 37, or no such areas are detected in the extracted-feature image Img1). In this case, the final likelihood determined by the final determination unit 38 is identical to the likelihood w_all input into the final determination unit 38.

The final determination unit 38 outputs the determined final likelihood to the posterior probability distribution estimation unit 5.

Based on the new object information, the final determination unit 38 updates the predictive probability distribution in a manner to retain only the predictive probability distribution data for objects to be tracked (including a new object to be tracked). The updated predictive probability distribution data is referred to as updated probability distribution data.

When the observation data is the extracted-feature image Img1 shown in FIG. 3, the final determination unit 38 sets the predictive probability distribution data output from the final determination unit 38 as data including only the predictive probability distribution data $S_{t|t-1}(\#1)$ for the tracking target object #1 and the predictive probability distribution data $S_{t|t-1}(\#2)$ for the tracking target object #2.

The likelihood and the predictive probability distribution data obtained for each object number are output from the final determination unit 38 to the posterior probability distribution estimation unit 5.

The posterior probability distribution estimation unit 5 performs resampling for each object number based on the likelihood and the updated probability distribution data obtained by the likelihood obtaining unit 3.

More specifically, when $4)(\#1)$ is the likelihood of the object #1 output from the final determination unit 38 at time t, the posterior probability distribution estimation unit 5 samples M1 particles without changing the total number of the particles at the ratio proportional to the likelihood $w_t^{(j)}(\#1)$ (sample the particle $xa_t^{(j)}(\#1)$, or the j-th particle of the object #1). The posterior probability distribution estimation unit 5 obtains a set of samples (a set of particles) $S_{t|t}(\#1)$ in accordance with the posterior probability distribution $p(x_t)\#1)|y_t(\#1)$ at time t from the distribution of the sampled M1 particles written as $$S_{t|t}(\#1)=\{s_{t|t}(1)(\#1),s_{t|t}(2)(\#1),\ldots,s_{t|t}(M1)(\#1)\}.$$

When $w_t^{(j)}(\#2)$ is the likelihood of the object #2 output from the final determination unit 38 at time t, the posterior probability distribution estimation unit 5 samples M2 particles without changing the total number of the particles at the ratio proportional to the likelihood $w_t^{(j)}(\#2)$ (samples the particle $xa_t^{(j)}(\#2)$, or the j-th particle of the object #2). The posterior probability distribution estimation unit 5 obtains a set of samples (a set of particles) $S_{t|t}(\#2)$ in accordance with the posterior probability distribution p at time t $(x_t(\#2)|y_t(\#2))$ from the distribution of the sampled M2 particles written as $$S_{t|t}(\#2)=\{s_{t|t}(1)(\#2),s_{t|t}(2)(\#2),\ldots,s_{t|t}(M2)(\#2)\}.$$

The number of particles M1 sampled without changing the total number of the particles for the object #1 and the number of particles M2 sampled without changing the total number of the particles for the object #2 are set such that their total (M1+M2) will be a constant value.

The posterior probability distribution data $(S_{t|t}(\#1), S_{t|t}(\#2))$ obtained for each currently-tracked object (for each object number) is output from the state estimation apparatus 1000. The posterior probability distribution data $(S_{t|t}(\#1), S_{t|t}(\#2))$ is also output to the prior probability distribution output unit 6.

The prior probability distribution output unit 6 outputs the posterior probability distribution (posterior probability distribution data) at time t input from the posterior probability distribution estimation unit 5 to the prediction unit 8 at the next time t+1 as the prior probability distribution (prior probability distribution data).

The above process is repeated to allow the state estimation apparatus 1000 to track multiple objects in an appropriate manner.

Figure 10:
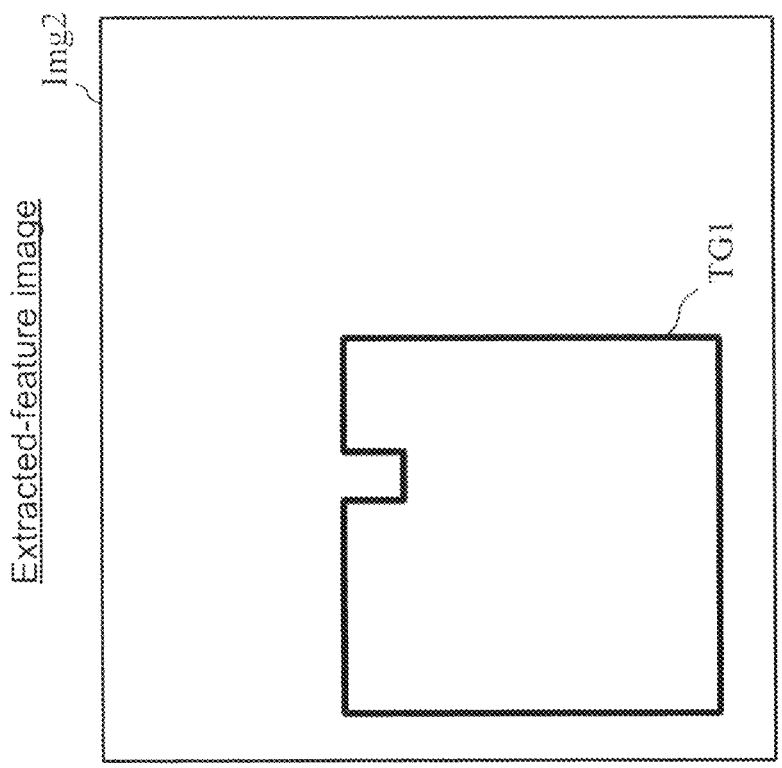
FIG. 10 shows an extracted-feature image Img2.
Figure 11:
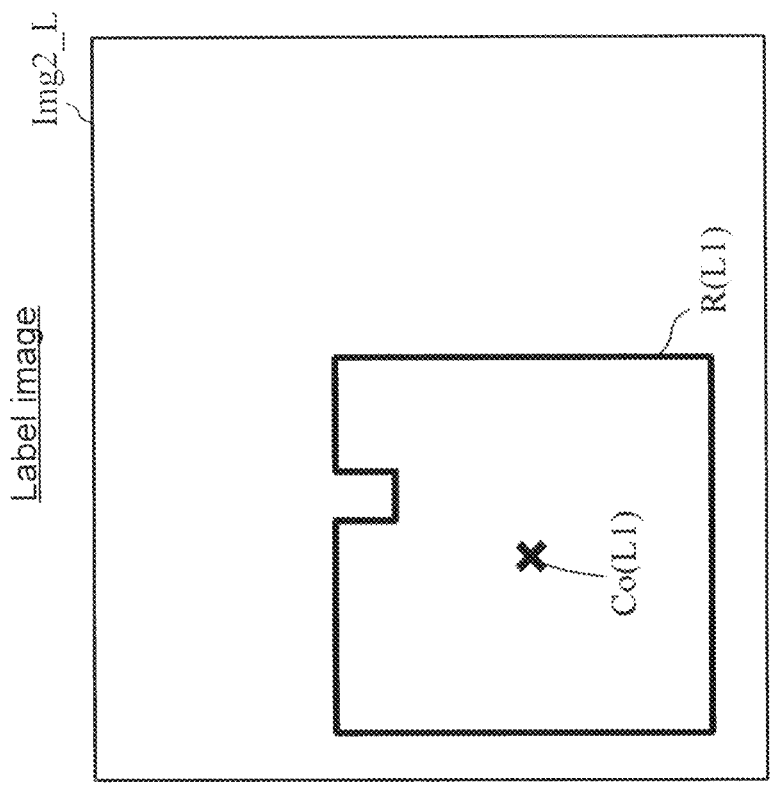
FIG. 11 shows a label image Img2_L.

1.2.5 New Object Detecting Process (in the example of FIGS. 10 to 11)

A process for detecting a new object when the label number of the currently-tracked object is not at the same coordinate position as the gravity center position Co(Rnew(#0)) of the new object candidate area Rnew(#0) detected by the new object candidate area detection unit 33 in the label image will now be described with reference to FIGS. 10 to 15.

FIG. 10 schematically shows observation data at time t. More specifically, FIG. 10 shows an image Img2 (extracted-feature image Img2) representing an extracted area with high redness obtained at time t by the observation obtaining unit 1. In the image Img2, the area TG1 is an area corresponding to a red object. The object corresponding to the area TG1 is given the object number #1.

FIG. 11 shows a label image Img2_L generated by the labeling unit 2 from the extracted-feature image Img2 shown in FIG. 10. FIG. 11 further shows the gravity center Co(L1) of the image area with the label number L1.

Figure 12:
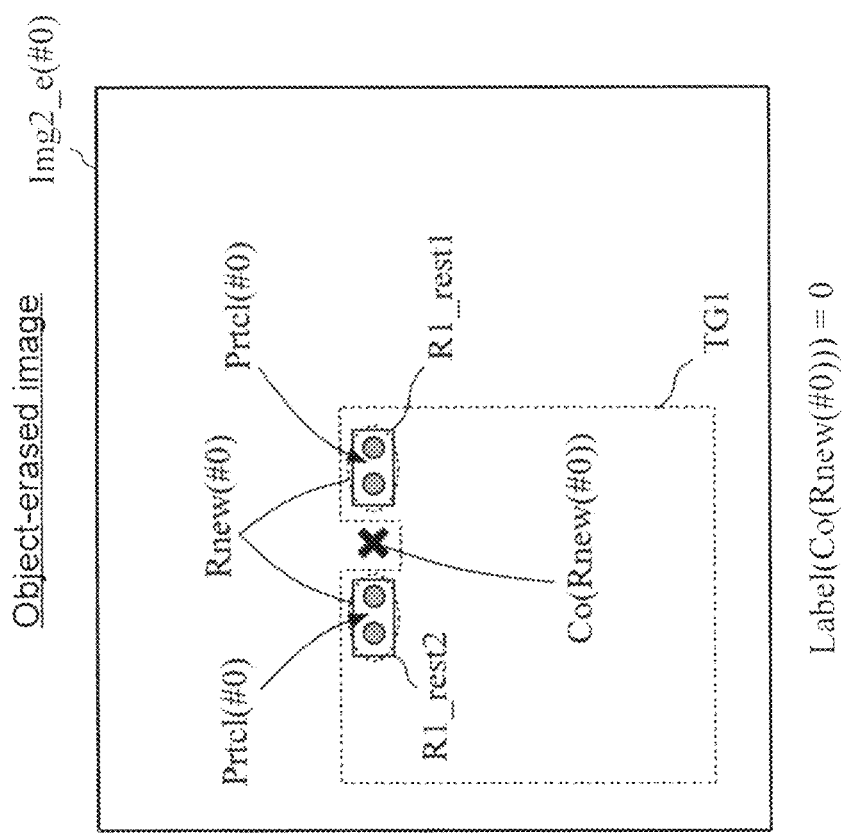
FIG. 12 is a diagram describing a process for detecting a candidate area for a new object from the object-erased image Img1_e(#0).

FIG. 12 is a diagram describing a process for detecting a candidate area for a new object from the object-erased image Img1_e(#0). For ease of explanation, the areas R1_rest1 and R1_rest2 shown in FIG. 12 are the areas remaining after the erasing is performed by the erasing unit 31. In FIG. 12, the area TG1 corresponding to the object #1 is indicated by a broken line to clarify the positional relationship between the area TG1 and the areas remaining after the erasure.

FIG. 12 shows only particles with which the likelihood is calculated to be equal to or greater than a predetermined value by the likelihood calculating unit 32 (indicated as the particle set Prtc1(#0)). More specifically, particles other than the particles shown in FIG. 12 have a pixel value of 0 in the object-erased image. Using those other particles, the likelihood is calculated to be 0. The particles included in the areas R1_rest1 and R1_rest2 do not have the pixel value of 0 in the object-erased image. Using those particles included in the areas R1_rest and R1_rest 2, the likelihood is not calculated to be 0 (but is calculated to be a positive value).

The new object candidate area detection unit 33 detects a new object candidate area Rnew(#0) based on the particles shown in FIG. 12 and the likelihood calculated using these particles.

In more detail, the new object candidate area detection unit 33 sets an area of the image occupied by the particles for which the likelihood is calculated to have a positive value (particles indicated by small dots in FIG. 12), or sets an area larger than the area occupied by the particles by a predetermined size, and determines (detects) an area corresponding to the union of the particle areas as the new object candidate area Rnew(#0). FIG. 12 shows the new object candidate area determined (detected) in this manner as an area Rnew(#0). As shown in FIG. 12, the detected area Rnew(#0) includes two separate areas.

The new object candidate area detection unit 33 outputs information about the determined (detected) new object candidate area Rnew(#0) to the gravity center detection unit 34 as data det_region.

The gravity center detection unit 34 detects the gravity center position Co(Rnew(#0)) of the new object candidate area Rnew(#0) detected by the new object candidate area detection unit 33. The gravity center detection unit 34 outputs information about the detected gravity center position Co(Rnew(#0)) to the new object detection unit 35. In the example shown in FIG. 12, the area Rnew(#0) includes two separate areas, and the cross mark shown in FIG. 12 indicates the gravity center position Co(Rnew(#0)) of the two separate areas.

The new object detection unit 35 determines whether the label number of the currently-tracked object is at the same coordinate position as the gravity center position Co(Rnew (#0)) of the new object candidate area Rnew(#0) in the label image detected by the gravity center detection unit 34.

In the example of FIG. 12, the cross mark indicates the gravity center position Co(Rnew(#0)) of the new object candidate area Rnew(#0), and the pixel in the label image Img1_L (the label image Img1_L shown in FIG. 11) at the same coordinate position as the gravity center position Co(Rnew(#0)) has a pixel value of 0 (a value indicating that no label is given).

In this case, the new object detection unit 35 performs a search process to determine whether the new object candidate area Rnew(#0) is an area corresponding to a new object, or an area remaining after the currently-tracked object is erased. This search process will be described with reference to FIG. 13.

Figure 13:
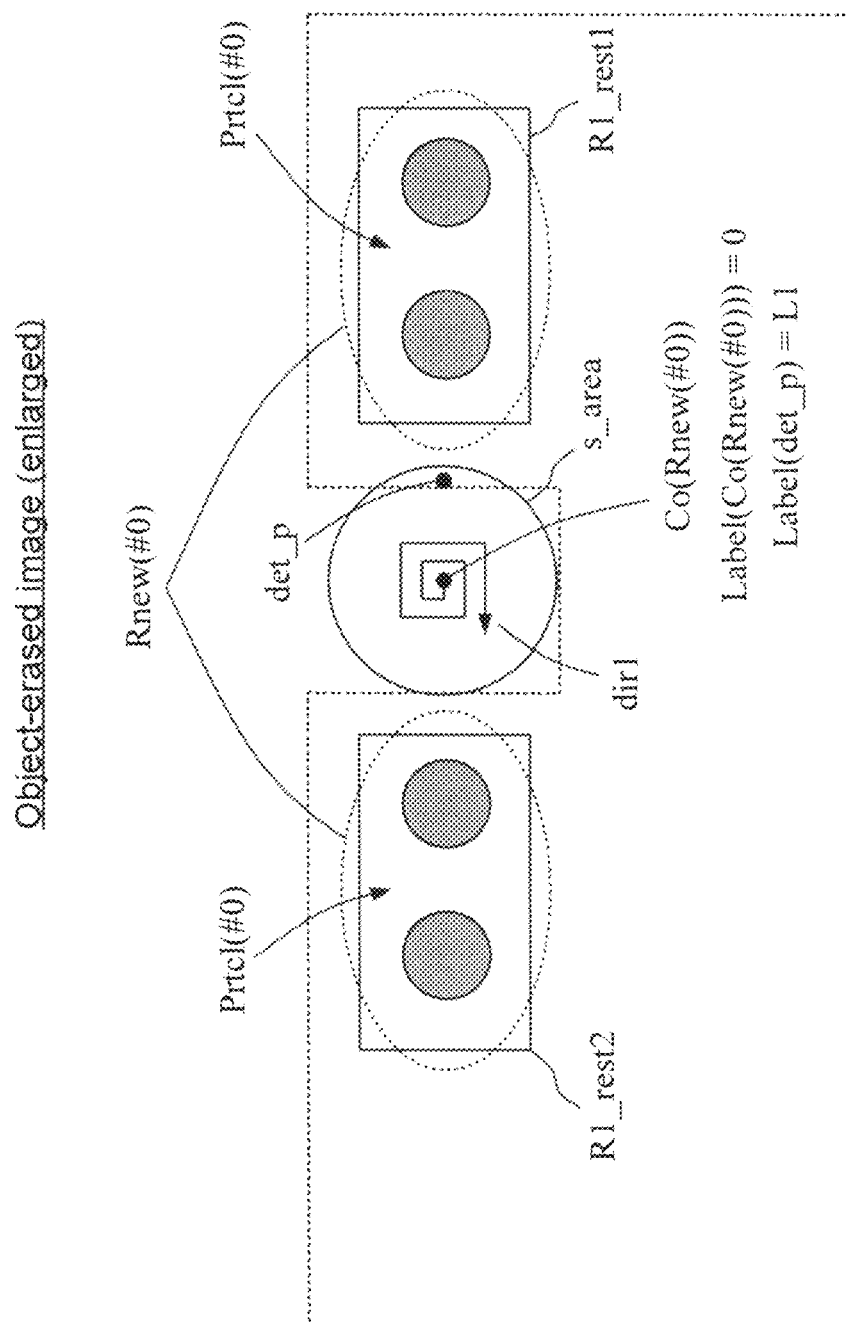
FIG. 13 is a diagram describing a search process (a partially enlarged view of FIG. 12).
Figure 14:
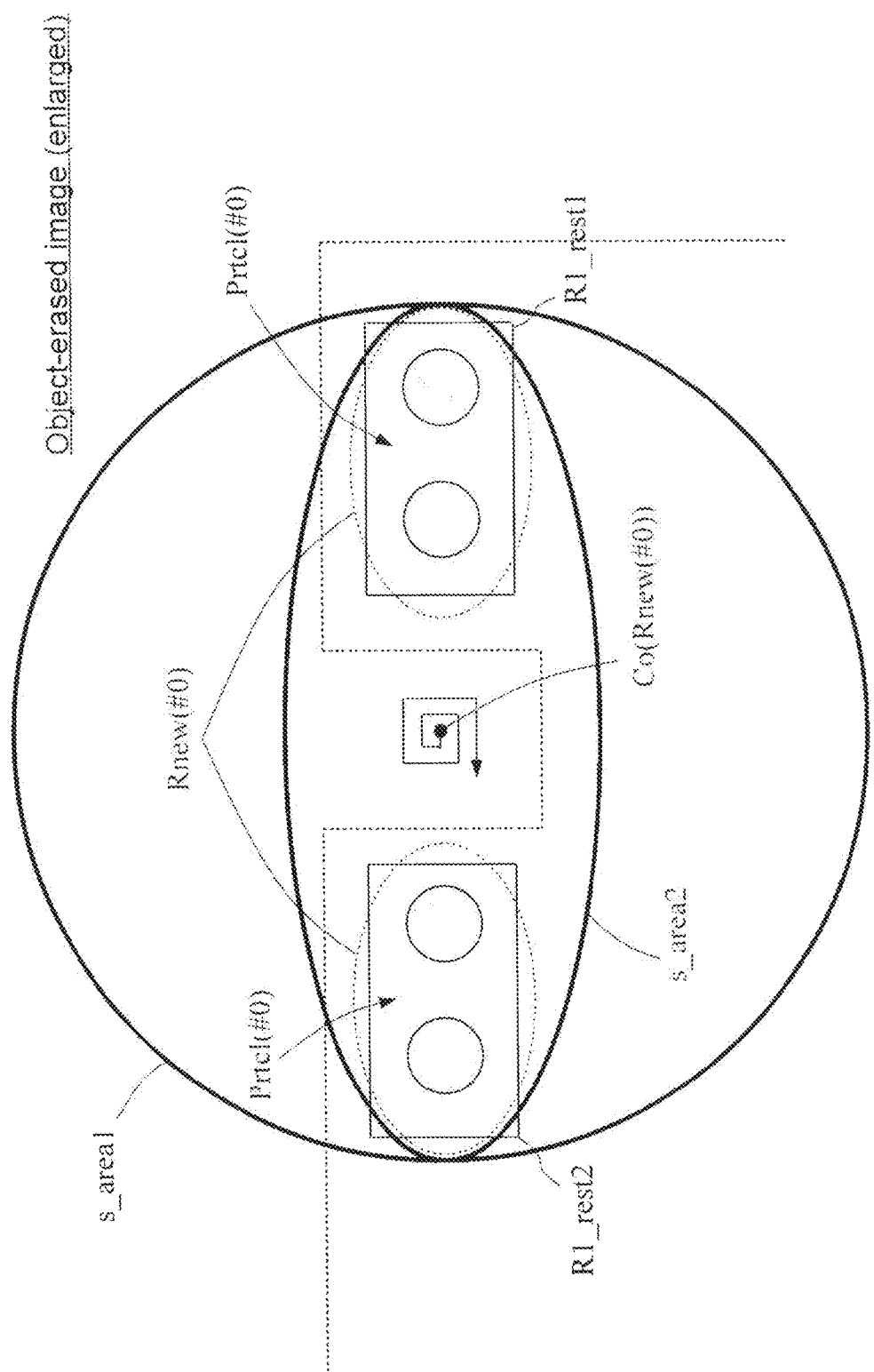
FIG. 14 shows a search area s_area1 (one example) and a search area s_area2 (one example).

FIG. 13 is a diagram describing the search process, and is a partially enlarged view of FIG. 12.

The new object detection unit 35 sets the search area s_area having a predetermined size when the pixel in the label image Img1_L at the gravity center position Co(Rnew (#0)) of the new object candidate area Rnew(#0) has a pixel value of 0 (pixel value indicating no label number), or in other words when $$\mathrm{Label}(Co(R\mathrm{new}(\#0)))=0,$$

where Label(x) is a function to obtain the label number at point x. The new object detection unit 35 determines whether the area of the label image Img1_L corresponding to the search area includes a pixel having a label number other than 0 and being associated with the object that is currently being tracked by the tracking object determination unit 37.

When the search area s_area is circular as shown in FIG. 13, the new object detection unit 35 searches the label image Img1_L by sequentially tracing (searching) pixels in the order of shorter distances from the gravity center Co(Rnew (#0)) of the new object candidate area Rnew(#0) (for example, sequentially processing pixels in the direction indicated by a spiral arrow dir1 in FIG. 13) to determine whether the search area s_area includes a pixel having a label number other than 0.

The new object detection unit 35 detects the first pixel with the label number other than 0 at the point det_p in FIG. 13 through the search process. In this case, the new object detection unit 35 obtains the label number at the point det_p through the search process, and detects that the label number at the point det_P is L1 (the pixel value of the point det_p in the label image Img1_L is 1), or more specifically, Label(Co(Rnew(#0)))=L1. The object with the label number L1 is the object #1, which is a currently-tracked object. Based on the detection result, the new object detection unit 35 determines that the new object candidate area Rnew(#0) is an area remaining after the erasure of the object #1 (label number L1). The new object detection unit 35 sets the determination result data det_new indicating the determination result to 0, and outputs the data to the selector 36 and the tracking object determination unit 37.

The tracking object determination unit 37 and the final determination unit 38 perform the same processing as described above (the processing in FIG. 9).

In the example shown in FIG. 10 to FIG. 13, the state estimation apparatus 1000 is prevented from erroneously determining that the area remaining after the erasure of the currently-tracked object is a new object area (a new object is detected).

Figure 15:
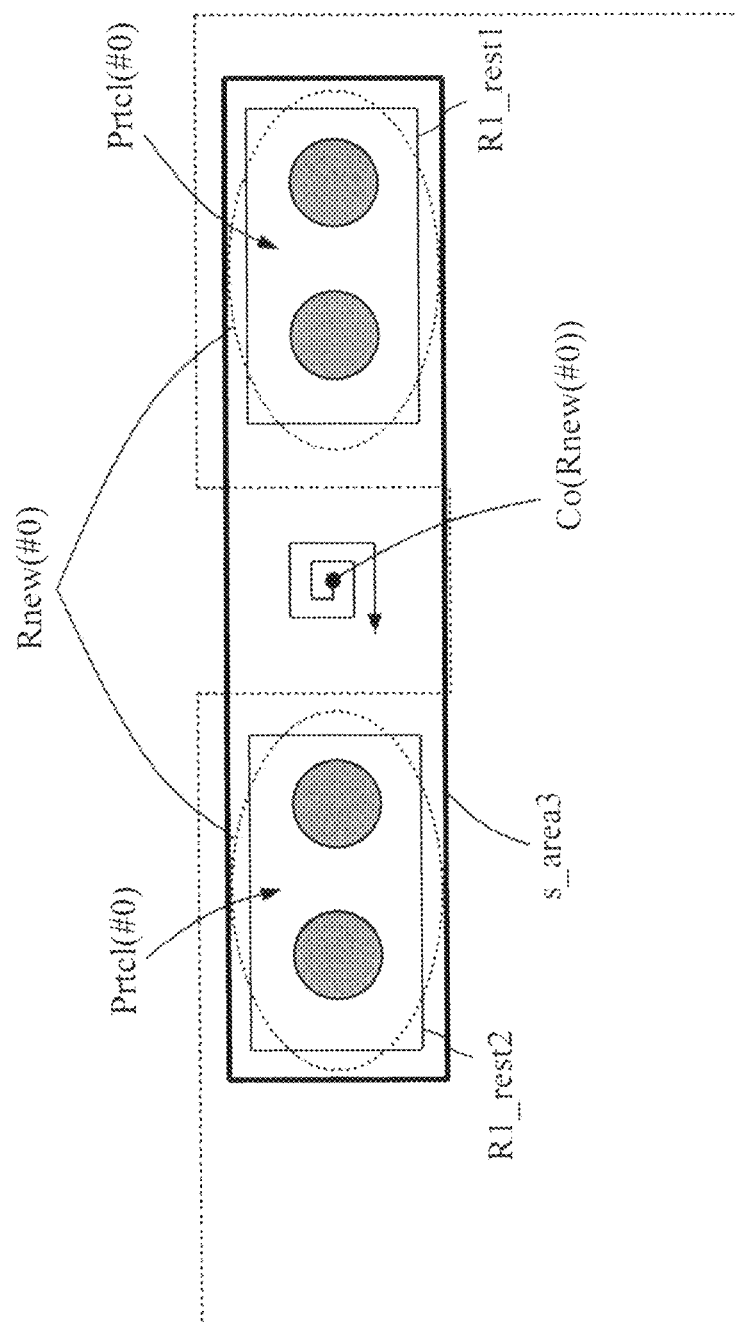
FIG. 15 shows a search area s_area3 (one example).

As described above, the new object detection unit 35 may set a circular area having a predetermined radius, for example, an area within a predetermined distance from the start point of the search, or point Co(Rnew(#0)), as the search area used in the search process, or may set a circular area including the new object candidate area Rnew(#0) (e.g., an area s_area1 in FIG. 14), an oval area (e.g., an area s_area2 in FIG. 14), or a rectangular area (e.g., a rectangular area s_area3 in FIG. 15).

The new object detection unit 35 may set a search area used in the search process based on the average size of the currently-tracked object. In this case, the tracking object determination unit 37 determines the size of the currently-tracked object based on, for example, the label determination area. The object information management unit 4 then stores information about the determined object size. The new object detection unit 35 obtains the information about the currently-tracked object stored by the object information management unit 4, calculates the average size of the currently-tracked object, and sets the search area based on the calculated value. The new object detection unit 35 may set a circular, oval, or rectangular area as the search area based on the average size of the currently-tracked object.

Figure 16:
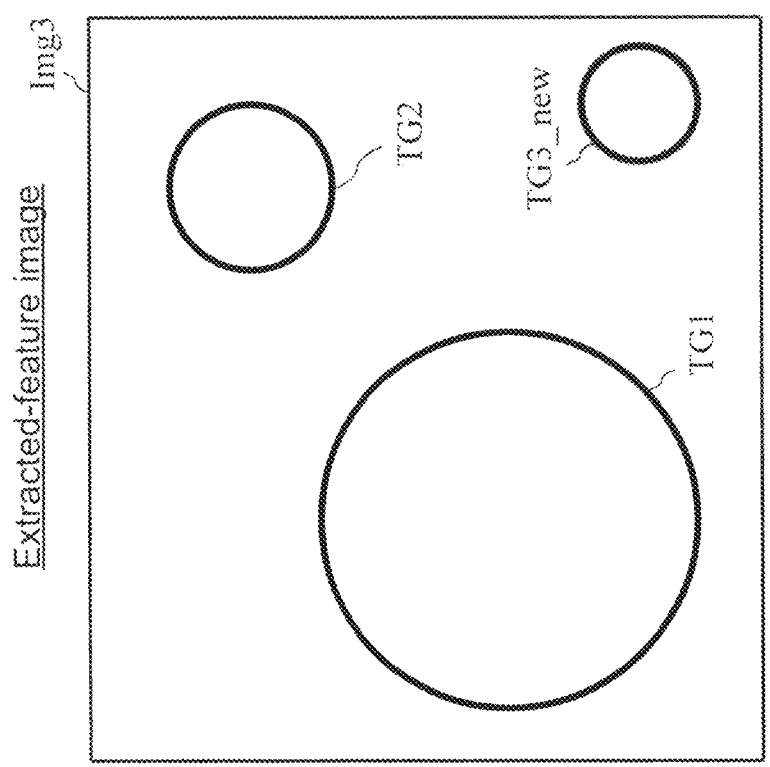
FIG. 16 shows an extracted-feature image Img3.
Figure 17:
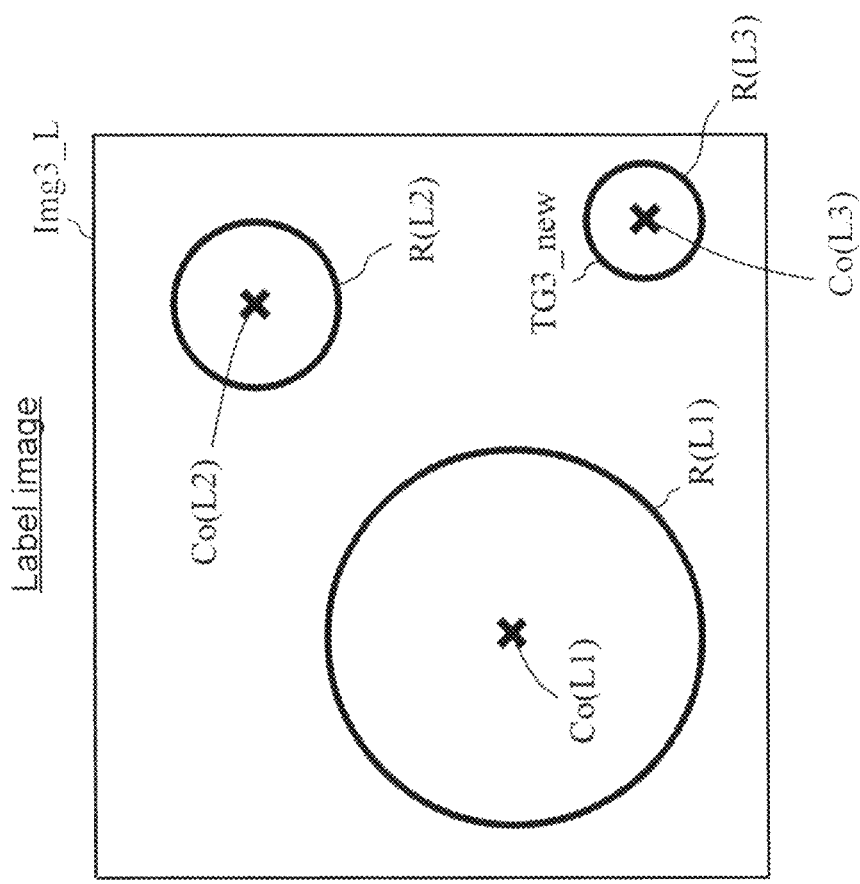
FIG. 17 shows a label image Img3_L.
Figure 18:
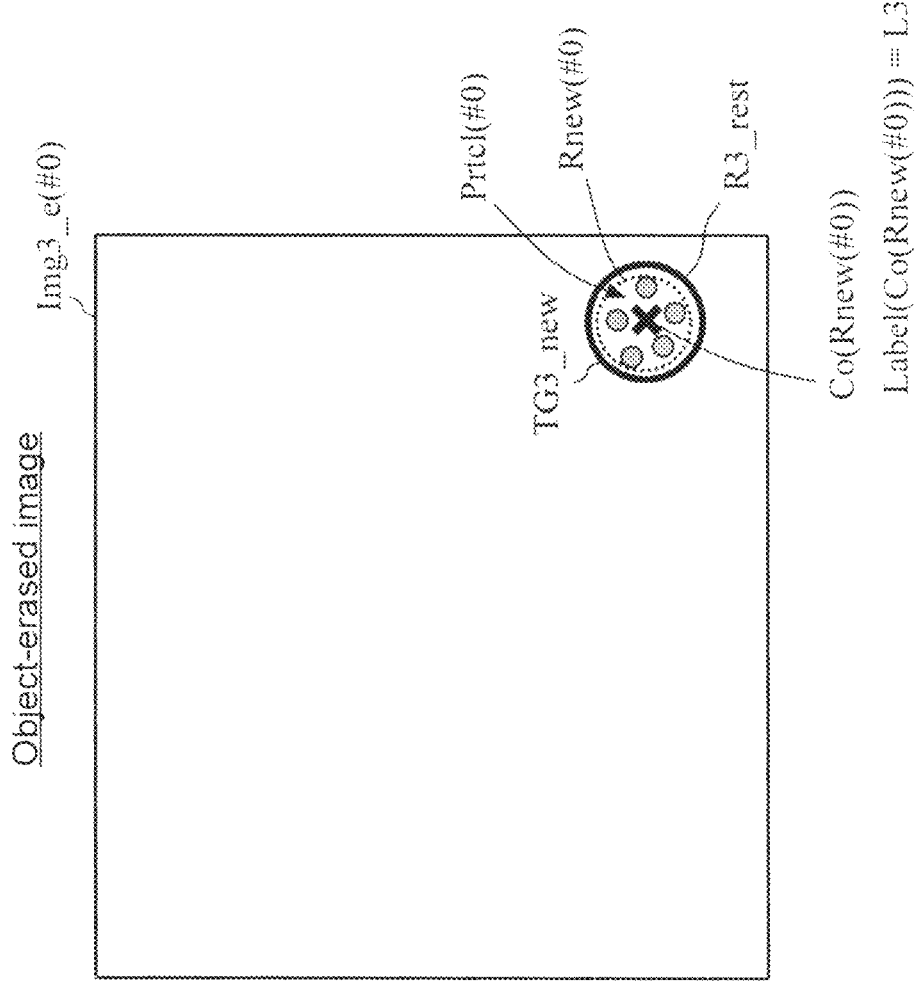
FIG. 18 is a diagram describing a process for detecting a candidate area for a new object from the object-erased image Img1_e(#0).
Figure 19B:
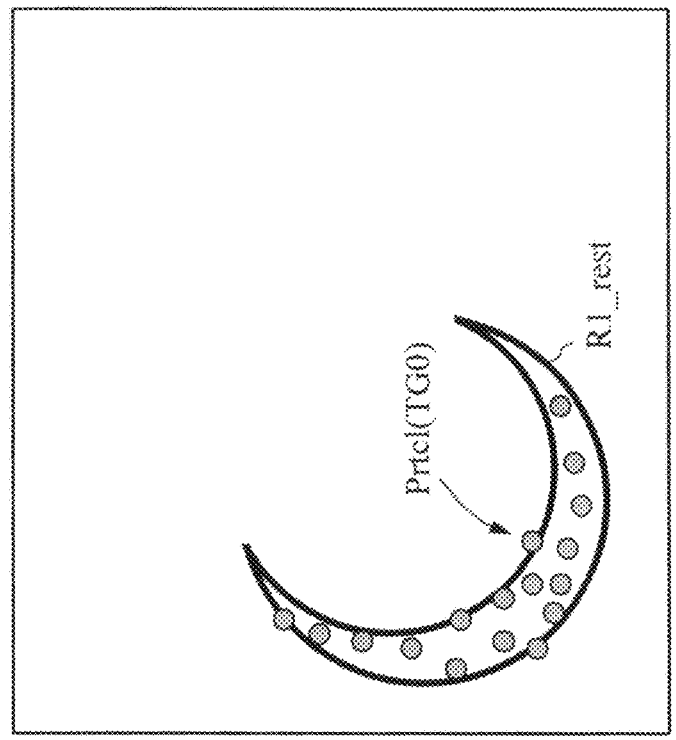
FIGS. 19A and 19B are diagrams describing the processing of, for example, tracking and detecting red objects through particle filtering from an extracted-feature image, or an image representing an extracted image feature quantity corresponding to redness extracted from a captured image.
Figure 19A:
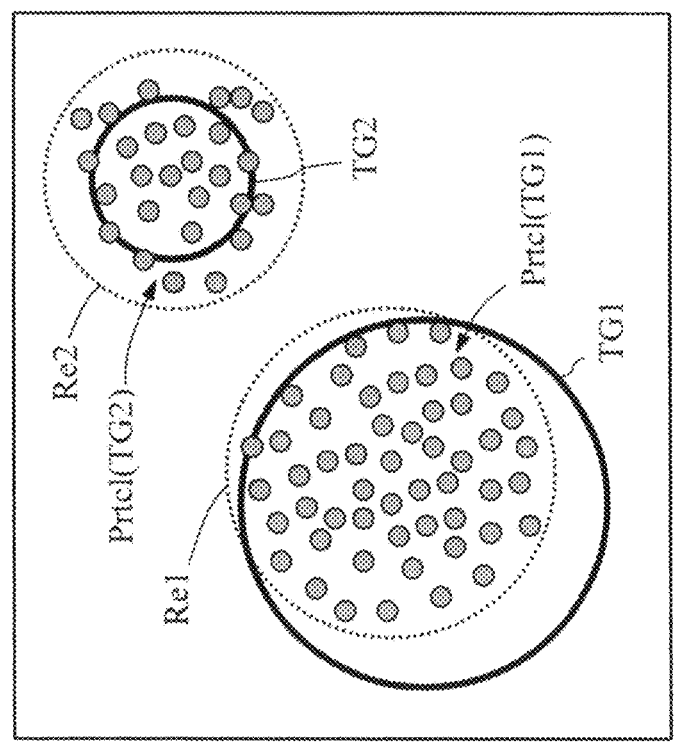

1.2.6 Process for Detecting New Object (in the Example of FIGS. 16 to 18)

The operation performed when a new object appears will be described with reference to FIGS. 16 to 18.

FIG. 16 schematically shows observation data at time t. In more detail, FIG. 16 shows an image Img3 (extracted-feature image Img3) representing an extracted area indicating high redness obtained by the observation obtaining unit 1 at time t. The image Img3 includes image areas TG1, TG2, and TG3_new, which correspond to red objects. The object corresponding to the area TG1 has the object number #1. The object corresponding to the area TG2 has the object number #2. The objects #1 and #2 are currently-tracked objects. The object corresponding to the area TG3_new is a new object (a newly appearing object).

FIG. 17 shows a label image Img3_L generated by the labeling unit 2 from the extracted-feature image Img3 shown in FIG. 16. In FIG. 17, the area R(L1) is detected as an area corresponding to the currently-tracked object #1. This area is given the label number L1. The area R(L2) is detected as an area corresponding to the currently-tracked object #2. This area is given the label number L2. The area R(L3) is detected as an area corresponding to the new object (the object corresponding to the area TG3_new in the extracted-feature image Img3). This area is given the label number L3. As shown in FIG. 17, the area R(L1) has the gravity center Co(L1), the area R(L2) has the gravity center Co(L2), and the area R(L3) has the gravity center Co(L3).

FIG. 18 is a diagram describing a process for detecting a candidate area for a new object from the object-erased image Img1_e(#0). For ease of explanation, the area remaining after the erasure performed by the erasing unit 31 is the area R3_rest shown in FIG. 18.

FIG. 18 only shows particles with which the likelihood calculated to be not less than a predetermined value by the likelihood calculating unit 32 (indicated as the particle set Prtc1(#0)). More specifically, particles other than the particles shown in FIG. 18 have a pixel value of 0 in the object-erased image. Using those other particles, the likelihood is calculated to be 0. The particles included in the area R3_rest do not have the pixel value of 0 in the object-erased image. Using those particles included in the area R3_rest, the likelihood is not calculated to be 0 (but is calculated as a positive value).

The new object candidate area detection unit 33 detects a new object candidate area Rnew(#0) based on the particles shown in FIG. 18 and the likelihood calculated using these particles.

More specifically, the new object candidate area detection unit 33 sets an area of the image occupied by each particle used to yield a positive likelihood value (the particles indicated by small dots in FIG. 18), or sets an area larger than the area occupied by each particle by a predetermined size, and determines (detects) an area corresponding to the union of the particle areas as a new object candidate area Rnew(#0). In FIG. 18, the area Rnew(#0) is the determined (detected) new object candidate area.

The new object candidate area detection unit 33 outputs information about the determined (detected) new object candidate area Rnew(#0) to the gravity center detection unit 34 as data det_region.

The gravity center detection unit 34 detects the gravity center position Co(Rnew(#0)) of the new object candidate area Rnew(#0) detected by the new object candidate area detection unit 33. The gravity center detection unit 34 outputs information about the detected gravity center position Co(Rnew(#0)) to the new object detection unit 35. In the example shown in FIG. 18, the cross mark shown in the figure indicates the gravity center position Co(Rnew(#0)) of the area Rnew(#0).

The new object detection unit 35 determines whether the label number of the currently-tracked object is at the same coordinate position as the gravity center position Co(Rnew(#0)) of the new object candidate area Rnew(#0) detected by the gravity center detection unit 34 in the label image.

In the example of FIG. 18, the cross mark indicates the gravity center position Co(Rnew(#0)) of the new object candidate area Rnew(#0), and the pixel in the label image Img1_L (the label image Img1_L shown in FIG. 17) at the same coordinate position as the gravity center position Co(Rnew(#0)) has a pixel value of 3 (a value indicating the label number L3).

In this case, the new object detection unit 35 determines whether the label number L3 matches the label number of the currently-tracked object based on the object information stored in the object information management unit 4. The currently-tracked object #1 has the label number L1, and the currently-tracked object #2 has the label number L2. The label number L3 at the gravity center position Co(Rnew(#0)) of the new object candidate area Rnew(#0) does not match any of the label numbers of the currently-tracked objects.

The new object detection unit 35 determines that the label number L3 at the gravity center position Co(Rnew(#0)) of the new object candidate area Rnew(#0) corresponds to a new object. More specifically, the new object detection unit 35 determines that the new object candidate area Rnew(#0) corresponds to a new object.

The new object detection unit 35 may perform the search process described above to search for an area having the same label number as any of the label numbers of the currently-tracked objects #1 and #2 around the gravity center position Co(Rnew(#0)) of the new object candidate area Rnew(#0). In this case, the new object detection unit 35 may determine that the new object candidate area Rnew(#0) corresponds to a new object when detecting no such area having the same label number as the label numbers of the currently-tracked objects #1 and #2 around the gravity center.

The new object detection unit 35 sets the determination result data det_new indicating the above determination result (determination result indicating that a new object has been detected) to 1, and outputs the data to the selector 36 and the tracking object determination unit 37.

In response to the determination result data det_new indicating 1, the selector 36 outputs the likelihood w(#0) obtained by the likelihood calculating unit 32 to the tracking object determination unit 37.

In response to the determination result data det_new indicating 1 received from the new object detection unit 35, the tracking object determination unit 37 determines that a new object has been detected, and performs a final determination process for determining whether the currently-tracked objects #1 and #2 and the new object #0 are to be continuously set as tracking targets at time steps subsequent to the current time t. The tracking object determination unit 37 obtains the normalized likelihood w_all for tracking the tracking target objects as well as the new object. This process will be described in detail.

The tracking object determination unit 37 normalizes the input likelihoods w(#1), w(#2), and w(#0) in a manner that the sum of the input likelihoods w(#1), w(#2), and w(#0) becomes a predetermined value (e.g., to 1), and uses the normalized likelihood w_all to calculate the sum of likelihoods for each object number.

For each of the currently-tracked objects #1 and #2, (1) when the sum of the calculated likelihoods exceeds a predetermined threshold th1, the tracking object determination unit 37 sets the status to Survive to continue the tracking process for the object with the current object number. (2) When the sum of the calculated likelihoods does not exceed the predetermined threshold th1, the tracking object determination unit 37 sets the status to Discard to stop the tracking process for the object with the current object number.

When the observation data is the extracted-feature image Img3 shown in FIG. 16, the sum of normalized likelihoods for the object number #1 and the sum of normalized likelihoods for the object number #2 both exceed the threshold th1. The tracking object determination unit 37 sets the status of the object #1 to Survive, and sets the status of the object #2 to Survive. When the observation data is the extracted-feature image Img3 shown in FIG. 16, the threshold th1 is set as a value greater than the sum of normalized likelihoods for the object number #1, and greater than the sum of normalized likelihoods for the object number #2.

The tracking object determination unit 37 outputs the set status to the object information management unit 4.

(1) When the sum of the calculated likelihoods exceeds a predetermined threshold th2, the tracking object determination unit 37 determines that the new object #0 has been detected, and sets the status to FoundNewTarget to start a tracking process for the new object. (2) When the sum of the calculated likelihoods does not exceed the predetermined threshold th2, the tracking object determination unit 37 determines that no new object (object #0) has been detected, and sets the status to NotFound.

When the observation data is the extracted-feature image Img3 shown in FIG. 16, the sum of normalized likelihoods for the object number #0 exceeds the threshold th2. The tracking object determination unit 37 determines that the new object #0 has been detected, and sets the status of the object #0 to FoundNewTarget. When the observation data is the extracted-feature image Img3 shown in FIG. 16, the threshold th2 is set as a value greater than the sum of normalized likelihoods for the object number #0.

In the above example, the tracking object determination unit 37 outputs the status FoundNewTarget to the object information management unit 4.

When receiving the status FoundNewTarget, the object information management unit 4 sets a value obtained by adding 1 to the largest object number of the currently-tracked objects as the object number of the new object. In the above example, the currently-tracked objects have the object numbers #1 and #2. The object information management unit 4 sets a value of 3 (#3), which is obtained by adding 1 to the largest object number, as the object number of the new object.

The tracking object determination unit 37 outputs the normalized likelihood w_all to the final determination unit 38.

The final determination unit 38 receives information about the new object from the object information management unit 4, and determines that the tracking target objects are the objects #1 to #3 based on the new object information. Based on the new object information, the final determination unit 38 retains likelihoods for objects to be tracked (objects #1 to #3) from the normalized likelihood w_all, and normalizes the retained likelihoods in a manner that the sum of the retained likelihoods becomes a predetermined value (e.g., to 1), and determines a final likelihood for each object number by using the likelihood obtained through the normalization.

When the observation data is the extracted-feature image Img3 shown in FIG. 16, the normalized likelihood w_all includes only the likelihood for the object #1, the likelihood for the object #2, and the likelihood for the object #3 (newly detected objects set as the tracking targets) (no objects with object numbers labeled with Discard or NotFound are detected by the tracking object determination unit 37, or no such areas are included in the extracted-feature image Img3). In this case, the final likelihood determined by the final determination unit 38 is identical to the likelihood w_all input into the final determination unit 38.

The final determination unit 38 outputs the determined final likelihood to the posterior probability distribution estimation unit 5.

Based on the new object information, the final determination unit 38 updates the predictive probability distribution data in a manner to retain only the predictive probability distribution data for objects to be tracked (objects #1 to #3). The updated predictive probability distribution data is referred to as updated probability distribution data.

When the observation data is the extracted-feature image Img16 shown in FIG. 16, the final determination unit 38 sets the predictive probability distribution data output from the final determination unit 38 as data including the predictive probability distribution data $S_{t|t-1}(\#1)$ for the tracking target object #1 and the predictive probability distribution data $S_{t|t-1}(\#2)$ for the tracking target object #2, and the probability distribution data $S_{t|t-1}(\#3)$ for the object #3 newly determined as a tracking target (predictive probability distribution data $S_{t|t-1}(\#3)$ obtained by using particles for new object detection from the object-erased image, which results from erasing the areas corresponding to the currently-tracked objects).

The likelihood and the predictive probability distribution data obtained for each object number are output from the final determination unit 38 to the posterior probability distribution estimation unit 5.

Subsequently, the same processing as described above performed when the observation data is the extracted-feature image Img1 shown in FIG. 3 will be performed.

As described above, the state estimation apparatus 1000 performs the new object detecting process based on label numbers, and thus is prevented from erroneously determining that an area remaining after the erasure of a currently-tracked object is a new object area.

The state estimation apparatus 1000 manages tracking target objects using object numbers, and performs particle filtering using particles assigned to each object number. The state estimation apparatus 1000 can thus perform the process for tracking multiple objects in an appropriate manner.

As described above, the state estimation apparatus 1000 tracks multiple objects in an appropriate manner, and also detects a new object and adds the detected new object as a tracking target in an appropriate manner.

Other Embodiments

Although the above embodiment describes the case in which two objects are used as currently-tracked objects, the embodiment should not be limited to this case (this structure). Any other numbers of objects may be used as the currently-tracked objects.

In the above embodiment, the sizes of the images and the particles, the number of particles, and other settings are schematically illustrated for ease of explanation. The embodiment should not be limited to such cases (structures).

In the above embodiment, the new object candidate area detection unit 33 determines the new object candidate area Rnew(#0) by setting an area of the image occupied by each particle with which the likelihood is calculated to be a positive value or setting an area larger than the area occupied by each particle by a predetermined size, and determining an area corresponding to the union of the particle areas as the new object candidate area Rnew(#0). The embodiment should not be limited to this structure. For example, the new object candidate area Rnew(#0) may be determined based on the likelihood calculated using the corresponding particles. In the same manner as described above, the area set (determined) based on the particles may be a larger area set based on the likelihood calculated using the corresponding particles.

In the above embodiment, the extracted-feature image is an image indicating redness in one example, the embodiment should not be limited to this case (this structure). The extracted-feature image may be an image representing another extracted image feature quantity.

In the above embodiment, the j-th sample (particles) $s_{t|t}^{(j)}(\#i)$ in the set of samples (the set of particles) $S_{t|t}(\#i)$ is vector data having, as its internal variables, the coordinate position $(Xt^{(j)}(\#i), Yt^{(j)}(\#i))$ of the j-th sample (particle) image and the radius $Rt^{(j)}(\#i)$ of a circular image area centered on the coordinate position $(Xt^{(j)}(\#i), Yt^{(j)}(\#i))$. However, the embodiment should not be limited to this case (this structure). For example, the internal variables may not include the radius but may include the vertical width and the horizontal width of a rectangular area centered on the j-th sample (particle), or may be other variables.

Each block of the state estimation apparatus described in the above embodiment may be formed using a single chip with a semiconductor device, such as an LSI (large-scale integration) device, or some or all of the blocks of the state estimation apparatus may be formed using a single chip.

Although LSI is used as the semiconductor device technology, the technology may be an IC (integrated circuit), a system LSI, a super LSI, or an ultra LSI depending on the degree of integration of the circuit.

The circuit integration technology employed should not be limited to LSI, but the circuit integration may be achieved using a dedicated circuit or a general-purpose processor. A field programmable gate array (FPGA), which is an LSI circuit programmable after manufactured, or a reconfigurable processor, which is an LSI circuit in which internal circuit cells are reconfigurable or more specifically the internal circuit cells can be reconnected or reset, may be used.

All or part of the processes performed by the functional blocks described in the above embodiment may be implemented using programs. All or part of the processes performed by the functional blocks described in the above embodiment may be implemented by a central processing unit (CPU) in a computer. The programs for these processes may be stored in a storage device, such as a hard disk or a ROM, and may be executed from the ROM or be read into a RAM and then executed.

The processes described in the above embodiment may be implemented by using either hardware or software (including use of an operating system (OS), middleware, or a predetermined library), or may be implemented using both software and hardware.

The processes described in the above embodiment may not be performed in the order specified in the above embodiment. The order in which the processes are performed may be changed without departing from the scope and the spirit of the invention.

The present invention may also include a computer program enabling a computer to implement the method described in the above embodiment and a computer readable recording medium on which such a program is recorded. The computer readable recording medium may be, for example, a flexible disk, a hard disk, a CD-ROM, an MO, a DVD, a DVD-ROM, a DVD-RAM, a large-capacity DVD, a next-generation DVD, or a semiconductor memory.

The computer program may not be recorded on the recording medium but may be transmitted with an electric communication line, a radio or cable communication line, or a network such as the Internet.

The term "unit" herein may include "circuitry," which may be partly or entirely implemented by using either hardware or software, or both hardware and software.

The specific structures described in the above embodiment of the present invention are mere examples, and may be changed and modified variously without departing from the scope and the spirit of the invention.

APPENDIXES

The present invention may also be expressed in the following forms.

A first aspect of the invention provides a state estimation apparatus for tracking a plurality of objects. The state estimation apparatus includes an observation obtaining unit, a labeling unit, an object information management unit, a prediction unit, a likelihood obtaining unit, a posterior probability distribution estimation unit, and a prior probability distribution output unit.

The observation obtaining unit obtains, at predetermined time intervals, an observation image that is observation data obtained from an observable event, and obtains an extracted-feature image representing a predetermined feature quantity extracted from the observation image.

The labeling unit extracts a closed image area from the observation image obtained by the observation obtaining unit, and adds a label number to the extracted area to generate a label image.

The object information management unit adds an object number to each target object to be tracked, and manages the object number added to each target object.

The prediction unit performs, for each object that is currently being tracked, prediction using posterior probability distribution data, and generates predictive probability distribution data for each currently-tracked object. The posterior probability distribution data indicates a probability distribution of an internal state of the object at a preceding time t−1. The predictive probability distribution data indicates a probability distribution of an internal state of the object at a current time t.

The likelihood obtaining unit obtains, for each object determined as currently being tracked at the preceding time t−1, particles based on the predictive probability distribution data, determines an area to be erased from the extracted-feature image based on the obtained particles to generate an object-erased image for tracking or an object-erased image for new object detection. The object-erased image for tracking is an image from which an area corresponding to an object other than a processing target object selected from the currently-tracked objects has been erased. The object-erased image for new object detection is an image from which an area corresponding to each of the currently-tracked objects has been erased.

The likelihood obtaining unit also generates particles for new object detection, uses the particles for new object detection to process the object-erased image to obtain a new object candidate area, and determines whether the new object candidate area corresponds to a new object that is to be a new tracking target at the current time t based on the obtained new object candidate area and the label image to determine a target object to be tracked at the time t.

The likelihood obtaining unit also calculates a final likelihood based on a likelihood that is calculated for each object determined to be a tracking target object at the time t by using the particles generated based on the predictive probability distribution data to process the object-erased image, and updates the predictive probability distribution data obtained by the prediction unit based on the calculated final likelihood to generate updated probability distribution data.

A posterior probability distribution estimation unit estimates, for each object determined to be a tracking target object at the time t, posterior probability distribution data for a state of the event from the updated probability distribution data and the final likelihood obtained by the likelihood obtaining unit.

The prior probability distribution output unit outputs the prior probability distribution data based on the posterior probability distribution data estimated by the posterior probability distribution estimation unit as prior probability distribution data at a next time t+1.

In this state estimation apparatus, the labeling unit detects a closed area from the observation image, and adds a label number to the closed area to generate a label image, and the likelihood obtaining unit generates an object-erased image for new object detection that is an image from which areas corresponding to all the currently-tracked objects have been erased. This state estimation apparatus performs the process for new object detection using the object-erased image for new object detection based on label numbers, and thus is prevented, in an appropriate manner, from erroneously determining that an area remaining after a currently-tracked object is erased from the object-erased image for new object detection corresponds to a new object area.

This state estimation apparatus manages tracking target objects using object numbers, and performs the process for tracking multiple objects in an appropriate manner through, for example, particle filtering using particles assigned to each object number.

This state estimation apparatus can thus track multiple objects in an appropriate manner, and detect a new object and add the object as a tracking target in an appropriate manner.

The closed area refers to, for example, an area including similar predetermined image feature quantities, and includes a collective area separable from other areas through clustering or other processing.

A second aspect of the invention provides the state estimation apparatus of the first aspect of the invention in which the likelihood obtaining unit includes an erasing unit, a likelihood calculating unit, a new object candidate area detection unit, a gravity center detection unit, a new object detection unit, a tracking object determination unit, and a final determination unit.

The erasing unit obtains, for each object determined as currently being tracked at the preceding time t−1, particles based on the predictive probability distribution data, determines an area to be erased from the extracted-feature image based on the obtained particles to generate an object-erased image for tracking or an object-erased image for new object detection. The object-erased image for tracking is an image from which an area corresponding to an object other than a processing target object selected from the currently-tracked objects has been erased. The object-erased image for new object detection is an image from which an area corresponding to each of the currently-tracked objects has been erased.

The likelihood obtaining unit obtains, for each object determined as currently being tracked at the preceding time t−1, particles based on the predictive probability distribution data, and calculates a likelihood for each object that is currently being tracked by using the obtained particles to process the object-erased image for tracking The likelihood calculation unit generates particles for new object detection and calculates a likelihood for a new object by using the obtained particles to process the object-erased image for new object detection.

The new object candidate area detection unit uses the particles for new object detection to process the object-erased image for new object detection to obtain the new object candidate area.

The gravity center detection unit detects a gravity center of the new object candidate area.

The new object detection unit determines whether the new object candidate area corresponds to a new object that is to be a new tracking target at the current time t based on the gravity center of the new object candidate area detected by the gravity center detection unit and the label image.

The tracking object determination unit determines a tracking target object at the time t based on a result of determination performed by the new object detection unit.

The final determination unit calculates a final likelihood based on the likelihood obtained by using the particles generated for each object determined as currently being tracked at the time t, based on the predictive probability distribution data to process the object-erased image, and updates the predictive probability distribution data obtained by the prediction unit based on the calculated final likelihood to obtain updated probability distribution data.

In this state estimation apparatus, the new object candidate area detection unit uses the particles for new object detection to obtain a new object candidate area. The new object detection unit then determines whether the new object candidate area corresponds to a new object that is to be a new tracking target at the current time t based on the gravity center of the obtained new object candidate area and the label image.

This state estimation apparatus can thus perform the process for new object detection with high accuracy based on the label image and the gravity center of the new object candidate area.

A third aspect of the invention provides the state estimation apparatus of the second aspect of the invention in which the tracking object determination unit obtains, as a label determination area, an area of the object-erased image for tracking corresponding to the object that is being tracked at the time t−1 for which a sum of likelihoods calculated at the time t exceeds a predetermined value, determines whether an area of the label image corresponding to the label determination area has a label number, and when determining that the label image area corresponding to the label determination area has a label number, the tracking object determination unit outputs object information associating an object number of the object and the label number to the object information management unit.

The object information management unit stores the object information.

The new object detection unit determines whether the label image includes a label number added to a pixel at the same coordinate position as the gravity center of the new object candidate area.

(A) When the label image includes a label number added to a pixel at the same coordinate position as the gravity center of the new object candidate area, the new object detection unit obtains the label number as a first label number, and determines whether the first label number matches an object number included in the object information stored in the object information management unit.

The Object Detection Unit (A1) determines that no new object is detected when the first label number matches the object number included in the object information, and (A2) determines that the new object candidate area is a candidate for a new object area when the first label number does not match the object number included in the object information.

(B) When the label image does not include a label number added to a pixel at the same coordinate position as the gravity center of the new object candidate area, the new object detection unit sets a search area with a predetermined size including the gravity center, and performs a search process for determining whether an area of the label image corresponding to the search area includes an image area having a label number matching an object number included in the object information stored in the object information management unit, and determines that no new object is detected when the area of the label image corresponding to the search area includes an image area having a label number matching an object number included in the object information.

The tracking object determination unit calculates a sum of likelihoods obtained by using the particles for new object detection to process the object-erased image for new object detection when the new object detection unit determines that the new object candidate area is a new object area, and determines that a new object is detected when the sum of likelihoods exceeds a predetermined threshold.

The final determination unit uses the likelihood obtained by using the particles for new object detection to process the object-erased image for new object detection as a likelihood for a new object in calculating the final likelihood, and uses probability distribution data obtained by using the particles for new object detection to process the object-erased image for new object detection as probability distribution data of a new tracking target object in obtaining the updated probability distribution data.

In this state estimation apparatus, the object detection unit sets a search area including the gravity center, and searches for an area of the label image corresponding to the search area for an area with a label number. The state estimation apparatus can thus perform the process for detecting a new object at high speed and with high accuracy.

A fourth aspect of the invention provides the state estimation apparatus of the third aspect of the invention in which the new object detection unit sets an area including the gravity center and including the new object candidate area as the search area.

This state estimation apparatus can reduce the possibility of erroneous search results in the searching process.

A fifth aspect of the invention provides the state estimation apparatus of the third aspect of the invention in which the new object detection unit sets an oval area including the gravity center as the search area.

This state estimation apparatus can set an oval area including the gravity center as the search area.

The oval area includes a circular area.

The long diameter or the short diameter of an oval or the radius of a circle may be determined based on a typical size, an average size, or a maximum size of a currently-tracked object or a tracking target object when the currently-tracked object or the tracking target object is known to have a predetermined size.

A sixth aspect of the invention provides the state estimation apparatus of the third aspect of the invention in which the new object detection unit sets a rectangular area including the gravity center as the search area.

This state estimation apparatus can set a rectangular area including the gravity center as the search area.

The size of the rectangle may be set based on a typical size, an average size, or a maximum size of a currently-tracked object or a tracking target object when the currently-tracked object or the tracking target object is known to have a predetermined size.

A seventh aspect of the invention provides the state estimation apparatus of one of the third to sixth aspects of the invention in which the new object detection unit uses the gravity center position as a start point of the search process in the search area, and sets image areas to undergo the search process sequentially from an image area with a smaller distance from the gravity center to an image area with a greater distance from the gravity center.

The image areas undergo the search process sequentially from image areas with smaller distances from the gravity center of the new object candidate area. This allows the search process to be performed efficiently.

An eighth aspect of the invention provides the state estimation apparatus of the seventh aspect of the invention in which the new object detection unit ends the search process when detecting an image area with a label number matching an object number included in the object information in the area of the label image corresponding to the search area.

This apparatus ends the search process immediately when detecting an image area with a label number matching the object number included in the object information, and thus increases the speed of the search process and prevents unnecessary continuation of the search process.

A ninth aspect of the invention provides a state estimation method for tracking a plurality of objects. The state estimation method includes an observation obtaining process, a labeling process, an object information management process, a predicting process, a likelihood obtaining process, a posterior probability distribution estimation process, and a prior probability distribution output process.

In the observation obtaining process, an observation image that is observation data obtained from an observable event is obtained at predetermined time intervals, and an extracted-feature image representing a predetermined feature quantity extracted from the observation image is obtained.

In the labeling process, a closed image area is extracted from the observation image obtained in the observation obtaining process, and a label number is added to the extracted area to generate a label image.

In the object information management process, an object number is added to each target object to be tracked, and the object number added to each target object is managed.

In the predicting process, prediction is performed for each object that is currently being tracked using posterior probability distribution data, and predictive probability distribution data is generated for each currently-tracked object. The posterior probability distribution data indicates a probability distribution of an internal state of the object at a preceding time t−1. The predictive probability distribution data indicates a probability distribution of an internal state of the object at a current time t.

In the likelihood obtaining process, particles are obtained for each object determined as currently being tracked at the preceding time t−1 based on the predictive probability distribution data, an area to be erased from the extracted-feature image is determined based on the obtained particles to generate an object-erased image for tracking or an object-erased image for new object detection. The object-erased image for tracking is an image from which an area corresponding to an object other than a processing target object selected from the currently-tracked objects has been erased. The object-erased image for new object detection is an image from which an area corresponding to each of the currently-tracked objects has been erased.

In the likelihood obtaining process, particles are generated for new object detection, and the particles for new object detection are used to process the object-erased image to obtain a new object candidate area, and determination is performed as to whether the new object candidate area corresponds to a new object that is to be a new tracking target at the current time t based on the obtained new object candidate area and the label image to determine a target object to be tracked at the time t.

In the likelihood obtaining process, a final likelihood is calculated based on a likelihood that is calculated for each object determined to be a tracking target object at the time t by using the particles generated based on the predictive probability distribution data to process the object-erased image, and the predictive probability distribution data obtained by the prediction unit is updated based on the calculated final likelihood to generate updated probability distribution data.

In the posterior probability distribution estimation process, posterior probability distribution data for a state of the event from the updated probability distribution data is estimated for each object determined to be a tracking target object at the time t, and the final likelihood is obtained by the likelihood obtaining unit.

In the prior probability distribution output process, the prior probability distribution data is output based on the posterior probability distribution data estimated by the posterior probability distribution estimation unit at a next time t+1 as prior probability distribution data.

The state estimation method for tracking a plurality of objects has the same advantageous effects as the state estimation apparatus of the first aspect of the present invention.

A tenth aspect of the invention provides an integrated circuit for performing a state estimation process for tracking a plurality of objects. The integrated circuit includes an observation obtaining unit, a labeling unit, an object information management unit, a prediction unit, a likelihood obtaining unit, a posterior probability distribution estimation unit, and a prior probability distribution output unit.

The observation obtaining unit obtains, at predetermined time intervals, an observation image that is observation data obtained from an observable event, and obtains an extracted-feature image representing a predetermined feature quantity extracted from the observation image.

The labeling unit extracts a closed image area from the observation image obtained by the observation obtaining unit, and adds a label number to the extracted area to generate a label image.

The object information management unit adds an object number to each target object to be tracked, and manages the object number added to each target object.

The prediction unit performs, for each object that is currently being tracked, prediction using posterior probability distribution data, and generates predictive probability distribution data for each currently-tracked object. The posterior probability distribution data indicates a probability distribution of an internal state of the object at a preceding time t−1. The predictive probability distribution data indicates a probability distribution of an internal state of the object at a current time t.

The likelihood obtaining unit obtains, for each object determined as currently being tracked at the preceding time t−1, particles based on the predictive probability distribution data, determines an area to be erased from the extracted-feature image based on the obtained particles to generate an object-erased image for tracking or an object-erased image for new object detection. The object-erased image for tracking is an image from which an area corresponding to an object other than a processing target object selected from the currently-tracked objects has been erased. The object-erased image for new object detection is an image from which an area corresponding to each of the currently-tracked objects has been erased.

The likelihood obtaining unit generates particles for new object detection, uses the particles for new object detection to process the object-erased image to obtain a new object candidate area, and determines whether the new object candidate area corresponds to a new object that is to be a tracking target at the current time t based on the obtained new object candidate area and the label image to determine a target object to be tracked at the time t.

The likelihood obtaining unit calculates a final likelihood based on a likelihood that is calculated for each object determined to be a tracking target object at the time t by using the particles generated based on the predictive probability distribution data to process the object-erased image, and updates the predictive probability distribution data obtained by the prediction unit based on the calculated final likelihood to generate updated probability distribution data.

The posterior probability distribution estimation estimates, for each object determined to be a tracking target object at the time t, posterior probability distribution data for a state of the event from the updated probability distribution data and the final likelihood obtained by the likelihood obtaining unit.

The prior probability distribution output unit outputs the prior probability distribution data based on the posterior probability distribution data estimated by the posterior probability distribution estimation unit as prior probability distribution data at a next time t+1.

The integrated circuit has the same advantageous effects as the state estimation apparatus of the first aspect of the present invention.

What is claimed is:

1. A state estimation apparatus for tracking a plurality of objects, the apparatus comprising:
observation obtaining circuitry configured to obtain, at each predetermined time interval, an observation image that is observation data obtained from an observable event, and obtain an extracted-feature image representing a predetermined feature quantity extracted from the obtained observation image;
labeling circuitry configured to extract a closed image area from the observation image obtained by the observation obtaining circuitry, and add a label number to the extracted closed image area to generate a label image;
object information management circuitry configured to add an object number to each target object to be tracked, and manage the object number added to each target object;
prediction circuitry configured to perform, for each object that is to be tracked at a current time t, prediction using posterior probability distribution data, and generate predictive probability distribution data for each object that is to be tracked at the current time t, the posterior probability distribution data indicating a probability distribution of an internal state of the object at a preceding time t−1, the predictive probability distribution data indicating a probability distribution of an internal state of the object at the current time t;
likelihood obtaining circuitry configured to:
(A) obtain, for each object determined as being tracked at the preceding time t−1, particles based on the predictive probability distribution data, and determine an area to be erased from the extracted-feature image based on the obtained particles to generate an object erased image for tracking or for a new object detection, the object-erased image for tracking being an image from which an area corresponding to an object other than a processing target object selected from the objects that are to be tracked at the current time t has been erased; the object-erased image for new object detection being an image from which an area corresponding to each of the objects that are to be tracked at the current time t has been erased,
(B) generate particles for the new object detection, use the particles for the new object detection to process the object-erased image to obtain a new object candidate area, and determine whether the new object candidate area corresponds to a new object that is to be a new tracking target at the current time t based on the obtained new object candidate area and the label image to determine a target object to be tracked at the time t, and (C) calculate a final likelihood based on a likelihood that is calculated for each object determined to be a tracking target object at the time t by using the particles generated based on the predictive probability distribution data to process the object-erased image, and update the predictive probability distribution data obtained by the prediction circuitry based on the calculated final likelihood to generate updated probability distribution data;

posterior probability distribution estimation circuitry configured to estimate, for each object determined to be a tracking target object at the time t, posterior probability distribution data for a state of the event from the updated probability distribution data and the final likelihood obtained by the likelihood obtaining circuitry; and prior probability distribution output circuitry configured to output probability distribution data based on the posterior probability distribution data estimated by the posterior probability distribution estimation circuitry as prior probability distribution data at a next time t+1.

2. The state estimation apparatus according to claim 1, wherein the likelihood obtaining circuitry includes erasing circuitry configured to obtain, for each object determined as being tracked at the preceding time t−1, particles based on the predictive probability distribution data, and determine an area to be erased from the extracted-feature image based on the obtained particles to generate an object-erased image for tracking or for a new object detection, the object-erased image for tracking being an image from which an area corresponding to an object other than a processing target object selected from the objects that are to be tracked at the current time t has been erased, the object-erased image for new object detection being an image from which an area corresponding to each of the objects that are to be tracked at the current time t has been erased, likelihood calculation circuitry configured to obtain, for each object determined as being tracked at the preceding time t−1, particles based on the predictive probability distribution data, and calculate a likelihood for each object that is to be tracked at the current time t by using the obtained particles to process the object-erased image for tracking, and configured to generate particles for new object detection and calculate a likelihood for a new object by using the obtained particles to process the object-erased image for new object detection, new object candidate area detection circuitry configured to use the particles for new object detection to process the object-erased image for new object detection to obtain the new object candidate area, gravity center detection circuitry configured to detect a gravity center of the new object candidate area, new object detection circuitry configured to determine whether the new object candidate area corresponds to a new object that is to be a new tracking target at the current time t based on the gravity center of the new object candidate area detected by the gravity center detection circuitry and the label image, tracking object determination circuitry configured to determine a tracking target object at the time t based on a result of determination performed by the new object detection circuitry, and final determination circuitry configured to calculate a final likelihood based on the likelihood obtained by using the particles generated for each object determined as being tracked at the time t, based on the predictive probability distribution data to process the object-erased image, and update the predictive probability distribution data obtained by the prediction circuitry based on the calculated final likelihood to obtain updated probability distribution data.

3. The state estimation apparatus according to claim 2, wherein the tracking object determination circuitry obtains, as a label determination area, an area of the object-erased image for tracking corresponding to the object that is being tracked at the time t−1 for which a sum of likelihoods calculated at the time t exceeds a predetermined value, determines whether an area of the label image corresponding to the label determination area has a label number, and when determining that the area of the label image corresponding to the label determination area has a label number, the tracking object determination circuitry outputs object information associating an object number of the object and the label number to the object information management circuitry, and the object information management circuitry stores the object information, the new object detection circuitry determines whether the label image includes a label number added to a pixel at the same coordinate position as the gravity center of the new object candidate area, and (A) when the label image includes a label number added to a pixel at the same coordinate position as the gravity center of the new object candidate area, the new object detection circuitry obtains the label number as a first label number, and determines whether the first label number matches an object number included in the object information stored in the object information management circuitry, and (A1) determines that no new object is detected when the first label number matches the object number included in the object information, and (A2) determines that the new object candidate area is a candidate for a new object area when the first label number does not match the object number included in the object information, (B) when the label image does not include a label number added to a pixel at the same coordinate position as the gravity center of the new object candidate area, the new object detection circuitry sets a search area with a predetermined size including the gravity center, and performs a search process for determining whether an area of the label image corresponding to the search area includes an image area having a label number matching an object number included in the object information stored in the object information management circuitry, and determines that no new object is detected when the area of the label image corresponding to the search area includes an image area having a label number matching an object number included in the object information, the tracking object determination circuitry calculates a sum of likelihoods obtained by using the particles for new object detection to process the object-erased image for new object detection when the new object detection circuitry determines that the new object candidate area is a new object area, and determines that a new object is detected when the sum of likelihoods exceeds a predetermined threshold, and the final determination circuitry uses the likelihood obtained by using the particles for new object detection to process the object-erased image for new object detection as a likelihood for a new object in calculating the final likelihood, and uses probability distribution data obtained by using the particles for new object detection to process the object-erased image for new object detection as probability distribution data for a new tracking target in obtaining the updated probability distribution data.

4. The state estimation apparatus according to claim 1, wherein the new object detection circuitry sets an area including the gravity center and including the new object candidate area as the search area.

5. The state estimation apparatus according to claim 1, wherein
the new object detection circuitry sets an oval area including the gravity center as the search area.

6. The state estimation apparatus according to claim 1, wherein
the new object detection circuitry sets a rectangular area including the gravity center as the search area.

7. The state estimation apparatus according to claim 1, wherein
the new object detection circuitry uses the gravity center as a start point of the search process in the search area, and sets image areas to undergo the search process sequentially from an image area with a smaller distance from the gravity center to an image area with a greater distance from the gravity center.

8. The state estimation apparatus according to claim 7, wherein
the new object detection circuitry ends the search process when detecting an image area with a label number matching an object number included in the object information in the area of the label image corresponding to the search area.

9. A state estimation method for tracking a plurality of objects, the method comprising:
(1) obtaining, at each predetermined time interval, an observation image that is observation data obtained from an observable event, and obtaining an extracted-feature image representing a predetermined feature quantity extracted from the obtained observation image;
(2) extracting a closed image area from the observation image obtained in the step of obtaining the observation image, and adding a label number to the extracted closed image area to generate a label image;
(3) adding an object number to each target object to be tracked, and managing the object number added to each target object;
(4) performing, for each object that is to be tracked at a current time t, prediction using posterior probability distribution data, and generating predictive probability distribution data for each object that is to be tracked at the current time t, the posterior probability distribution data indicating a probability distribution of an internal state of the object at a preceding time t−1, the predictive probability distribution data indicating a probability distribution of an internal state of the object at the current time t;

(5a) obtaining, for each object determined as being tracked at the preceding time t−1, particles based on the predictive probability distribution data, determining an area to be erased from the extracted-feature image based on the obtained particles to generate an object-erased image for tracking or for a new object detection; the object-erased image for tracking being an image from which an area corresponding to an object other than a processing target object selected from the objects that are to be tracked at the current time t has been erased, the object-erased image for new object detection being an image from which an area corresponding to each of the objects that are to be tracked at the current time t has been erased, (5b) generating particles for the new object detection, using the particles for the new object detection to process the object-erased image to obtain a new object candidate area, and determining whether the new object candidate area corresponds to a new object that is to be a new tracking target at the current time t based on the obtained new object candidate area and the label image to determine a target object to be tracked at the time t, and (5c) calculating a final likelihood based on a likelihood that is calculated for each object determined to be a tracking target object at the time t by using the particles generated based on the predictive probability distribution data to process the object-erased image, and updating the predictive probability distribution data obtained in the step of performing the prediction based on the calculated final likelihood to generate updated probability distribution data;

(6) estimating, for each object determined to be a tracking target object at the time t, posterior probability distribution data for a state of the event from the updated probability distribution data and the final likelihood obtained in the step of calculating the final likelihood; and (7) outputting probability distribution data based on the posterior probability distribution data estimated in the step of estimating the posterior probability distribution data as prior probability distribution data at a next time t+1.

10. An integrated circuit for performing a state estimation process for tracking a plurality of objects, the integrated circuit comprising:
observation obtaining circuitry configured to obtain, at each predetermined time interval, an observation image that is observation data obtained from an observable event, and obtain an extracted-feature image representing a predetermined feature quantity extracted from the obtained observation image;
labeling circuitry configured to extract a closed image area from the observation image obtained by the observation obtaining circuitry, and add a label number to the extracted closed image area to generate a label image;
object information management circuitry configured to add an object number to each target object to be tracked, and manage the object number added to each target object;
prediction circuitry configured to perform, for each object that is to be tracked at a current time t, prediction using posterior probability distribution data, and generate predictive probability distribution data for each object that is to be tracked at the current time t, the posterior probability distribution data indicating a probability distribution of an internal state of the object at a preceding time t−1, the predictive probability distribution data indicating a probability distribution of an internal state of the object at the current time t;

likelihood obtaining circuitry configured to:

(A) obtain, for each object determined as being tracked at the preceding time t−1, particles based on the predictive probability distribution data, and determine an area to be erased from the extracted-feature image based on the obtained particles to generate an object-erased image for tracking or for a new object detection, the object-erased image for tracking being an image from which an area corresponding to an object other than a processing target object selected from the objects that are to be tracked at the current time t has been erased, the object-erased image for new object detection being an image from which an area corresponding to each of the objects that are to be tracked at the current time t has been erased, (B) generate particles for the new object detection, use the particles for the new object detection to process the object-erased image to obtain a new object candidate area, and determine whether the new object candidate area corresponds to a new object that is to be a new tracking target at the current time t based on the obtained new object candidate area and the label image to determine a target object to be tracked at the time t, and (C) calculate a final likelihood based on a likelihood that is calculated for each object determined to be a tracking target object at the time t by using the particles generated based on the predictive probability distribution data to process the object-erased image, and update the predictive probability distribution data obtained by the prediction circuitry based on the calculated final likelihood to generate updated probability distribution data;

posterior probability distribution estimation circuitry configured to estimate, for each object determined to be a tracking target object at the time t, posterior probability distribution data for a state of the event from the updated probability distribution data and the final likelihood obtained by the likelihood obtaining circuitry; and prior probability distribution output circuitry configured to output probability distribution data based on the posterior probability distribution data estimated by the posterior probability distribution estimation circuitry as prior probability distribution data at a next time t+1.

* * * * *